(12) United States Patent
Lyu

(10) Patent No.: US 10,517,096 B2
(45) Date of Patent: Dec. 24, 2019

(54) METHOD FOR SENDING CONTROL INFORMATION, USER EQUIPMENT, AND BASE STATION

(71) Applicant: Huawei Technologies Co., Ltd., Shenzhen (CN)

(72) Inventor: Yongxia Lyu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 41 days.

(21) Appl. No.: 15/719,717

(22) Filed: Sep. 29, 2017

(65) Prior Publication Data

US 2018/0027547 A1    Jan. 25, 2018

Related U.S. Application Data

(63) Continuation of application No. PCT/CN2015/075357, filed on Mar. 30, 2015.

(51) Int. Cl.
*H04W 4/00* (2018.01)
*H04W 72/04* (2009.01)
(Continued)

(52) U.S. Cl.
CPC .......... *H04W 72/048* (2013.01); *H04L 1/16* (2013.01); *H04L 1/1829* (2013.01);
(Continued)

(58) Field of Classification Search
CPC ....... H04L 1/0072; H04L 1/16; H04L 1/1621; H04L 1/08; H04L 1/1829; H04L 1/1861;
(Continued)

(56) References Cited

U.S. PATENT DOCUMENTS 8,830,883 B2 * 9/2014 Chen ............... H04L 5/0053
370/280
8,837,450 B2 * 9/2014 Papasakellariou .... H04L 1/1861
370/342

(Continued)

FOREIGN PATENT DOCUMENTS

CN    102573083 A    7/2012
CN    102918793 A    2/2013
(Continued)

OTHER PUBLICATIONS

R1-104578, DAI design for LTE-A TDD, 3GPP TSG RAN WG1 meeting #62, 4 pages, Aug. 2010.*
(Continued)

*Primary Examiner* — Frank Duong
(74) *Attorney, Agent, or Firm* — Slater Matsil, LLP

(57) ABSTRACT

An embodiment method includes method includes receiving, by a user equipment, a plurality of pieces of first downlink control information sent by a base station, wherein pieces of the plurality of pieces of first downlink control information carry downlink assignment indexes, and wherein at least one piece of the plurality of pieces of first downlink control information further carries a total downlink assignment indexes. The method also includes generating, by the user equipment, a hybrid automatic repeat request response message according to the total downlink assignment indexes, according to the downlink assignment indexes of the pieces of the plurality of pieces of first downlink control information, and according to a physical downlink shared channel corresponding to the pieces of the plurality of pieces of first downlink control information. Additionally, the method includes ending, by the user equipment, the hybrid automatic repeat request response message to the base station.

20 Claims, 10 Drawing Sheets

Receive at least one piece of first downlink control information sent by a base station, where each piece of first downlink control information carries a downlink assignment index, and at least one piece of the first downlink control information further carries a total downlink assignment index — Step 101

Generate a hybrid automatic repeat request response message according to the total downlink assignment index, the downlink assignment index of each piece of first downlink control information, and a physical downlink shared channel corresponding to each piece of first downlink control information — Step 102

Send the hybrid automatic repeat request response message to the base station — Step 103

(51) Int. Cl.
*H04L 1/16* (2006.01)
*H04L 1/18* (2006.01)
*H04W 52/14* (2009.01)
*H04W 52/54* (2009.01)
*H04L 1/12* (2006.01)

(52) U.S. Cl.
CPC ....... *H04W 72/0413* (2013.01); *H04L 1/1893* (2013.01); *H04L 2001/125* (2013.01); *H04W 52/143* (2013.01); *H04W 52/54* (2013.01); *H04W 72/042* (2013.01)

(58) Field of Classification Search
CPC ..... H04L 1/1893; H04L 1/1896; H04L 1/201; H04L 27/2601; H04L 2001/125; H04W 52/143; H04W 52/54; H04W 72/04; H04W 72/0413; H04W 72/042; H04W 72/048
See application file for complete search history.

(56) References Cited

U.S. PATENT DOCUMENTS

| | | | |
|---|---|---|---|
| 8,885,587 B2 * | 11/2014 | Chen ................. | H04L 1/1685 370/329 |
| 9,112,694 B2 * | 8/2015 | Seo ................... | H04L 1/1861 |
| 9,252,927 B2 * | 2/2016 | Chen ................. | H04L 1/1854 |
| 9,258,812 B2 * | 2/2016 | Han ................... | H04L 1/1861 |
| 9,369,994 B2 * | 6/2016 | Lee ................... | H04W 72/04 |
| 2011/0116457 A1 | 5/2011 | Damnjanovic et al. | |
| 2011/0128922 A1 | 6/2011 | Chen et al. | |
| 2012/0039279 A1 | 2/2012 | Chen et al. | |
| 2012/0320805 A1 * | 12/2012 | Yang ................. | H04L 1/18 370/280 |
| 2013/0100866 A1 | 4/2013 | Yang et al. | |
| 2013/0322378 A1 | 12/2013 | Guan et al. | |
| 2014/0301324 A1 | 10/2014 | Cheng et al. | |
| 2014/0328292 A1 | 11/2014 | Yang et al. | |
| 2015/0110017 A1 | 4/2015 | Park et al. | |
| 2015/0237619 A1 | 8/2015 | Yang et al. | |
| 2016/0150527 A1 | 5/2016 | Yang et al. | |
| 2016/0249380 A1 * | 8/2016 | Lee ................... | H04W 72/042 |
| 2017/0366323 A1 * | 12/2017 | Ahn ................... | H04L 5/00 |

FOREIGN PATENT DOCUMENTS

| | | |
|---|---|---|
| CN | 103098408 A | 5/2013 |
| CN | 103109488 A | 5/2013 |
| CN | 103178926 A | 6/2013 |
| CN | 103339999 A | 10/2013 |
| JP | 2012526481 A | 10/2012 |
| JP | 2012529238 A | 11/2012 |
| JP | 2015506630 A | 3/2015 |
| WO | 2012015215 A2 | 2/2012 |
| WO | 2012044115 A2 | 4/2012 |
| WO | 2013141594 A1 | 9/2013 |

OTHER PUBLICATIONS

3GPP TSG RAN WG1 Meeting #80, R1-150105, "HARQ-ACK transmission on PUCCH for Rel-13 CA", CATT, Athens, Greece, Feb. 9-13, 2015, 4 pages.

3GPP TS 36.212 V12.4.0, "3rd Generation Parintership Project; Technical Specification Group Radio Access Network; Evolved Universal Terrestrial Radio Access (E-UTRA); Multiplexing and channel coding (Release 12)," Mar. 2015; 94 pages.

3GPP TS 36.213 V12.2.0, "3rd Generation Partnership Project; Technical Specification Group Radio Access Network; Evolved Universal Terrestrial Radio Access (E-UTRA); Physical layer procedures (Release 12)," Jun. 2014; 207 pages.

3GPP TS 36.213 V12.5.0, "3rd Generation Partnership Project; Technical Specification Group Radio Access Network; Evolved Universal Terrestrial Radio Access (E-UTRA); Physical layer procedures (Release 12)," Mar. 2015; 239 pages.

Zte et al., 3GPP TSG-RAN WG1 Meeting #66 R1-112849, "Corrections on UE procedure for reporting HARQ-ACK", Aug. 22-26, 2011; 8 pages, Athens, Greece.

* cited by examiner

US 10,517,096 B2

METHOD FOR SENDING CONTROL INFORMATION, USER EQUIPMENT, AND BASE STATION

CROSS-REFERENCE TO RELATED APPLICATIONS

This application is a continuation of International Application No. PCT/CN2015/075357, filed on Mar. 30, 2015, the disclosure of which is hereby incorporated by reference in its entirety.

TECHNICAL FIELD

Embodiments of the present disclosure relate to the communications technologies, and in particular, to a method for sending control information, user equipment, and a base station.

BACKGROUND

Long Term Evolution (LTE for short) is long term evolution of a Universal Mobile Telecommunications System (UMTS) technology standard specified by the 3rd Generation Partnership Project (3GPP for short) organization. With key technologies such as orthogonal frequency division multiplexing (OFDM for short) and multiple-input multiple-output (MIMO for short) introduced, Long Term Evolution significantly increases spectral efficiency and a data transmission rate, and therefore is widely developed in recent years.

An LTE system is based on orthogonal frequency division multiple access (OFDMA for short) and single carrier frequency division multiple access (SC-FDMA for short) in the downlink and the uplink respectively. A time-frequency resource is divided into an OFDM or SC-FDMA symbol (hereinafter referred to as a time-domain symbol) in a time domain dimension and a subcarrier in a frequency domain dimension. A smallest resource granularity is referred to as a resource element (RE for short), which represents a time-frequency grid formed by one time-domain symbol in a time domain and one subcarrier in a frequency domain. In the LTE system, service transmission is based on scheduling by a base station (eNB for short), a basic time unit of scheduling is one subframe, and one subframe includes multiple time-domain symbols. A specific scheduling process is as follows: The base station sends a control channel, such as a physical downlink control channel (PDCCH for short) or an enhanced physical downlink control channel (EPDCCH for short). The control channel may carry scheduling information of a physical downlink shared channel (PDSCH for short) or a physical uplink shared channel (PUSCH for short), and the scheduling information includes control information such as resource allocation information or a modulation and coding scheme. User equipment (UE for short) detects the control channel in a subframe, and receives a downlink data channel or sends an uplink data channel according to the scheduling information carried by the detected control channel.

LTE supports two duplex modes: frequency division duplex (FDD for short) and time division duplex (TDD for short). For FDD, downlink and uplink transmission is performed on different carriers. For a TDD system, uplink and downlink transmission is performed at different time of a same carrier. Specifically, one carrier includes a downlink subframe, an uplink subframe, and a special subframe. LTE currently supports seven different TDD uplink-downlink configurations.

In LTE, a hybrid automatic repeat request (HARQ for short) mechanism is used to implement a function of error detection and correction. For example, in the downlink, after the UE receives a PDSCH, if the PDSCH is correctly received, the UE feeds back an acknowledgment (ACK for short) on a physical uplink control channel (PUCCH); or if the PDSCH is incorrectly received, the UE feeds back a negative acknowledgment (NACK for short) on a PUCCH. LTE further supports a carrier aggregation (CA for short) technology, that is, the base station configures multiple carriers for one UE to improve a data rate of the UE. During CA, multiple carriers sent by the base station are synchronously sent in terms of time. The UE can separately detect a PDCCH that schedules each carrier and a corresponding PDSCH. A specific detection process for each carrier is similar to that for the foregoing single carrier. The LTE system supports FDD CA, TDD CA, and FDD+TDD CA. TDD CA is further classified into TDD CA with a same uplink-downlink configuration and TDD CA with different uplink-downlink configurations. In a CA mode, there is one primary component carrier and at least one secondary component carrier, and a PUCCH that carries an ACK/NACK is sent only on the primary component carrier of the UE. When HARQ-ACKs of multiple downlink carriers are transmitted on one PUCCH channel or PUSCH channel, joint coding is generally used. In the LTE system, uplink control signaling mainly has two coding manners. One is linear block code such as Reed Muller (RM for short), and the other is convolutional code. Regardless of which coding manner is used, in a general decoding manner, before correctly performing decoding, the base station needs to know a total original information bit quantity for joint coding performed by the user equipment.

Generally, the UE calculates a total original information bit quantity for HARQ-ACK joint coding according to a quantity of detected PDSCHs on downlink carriers. In this case, once the UE misses a PDSCH on a downlink carrier during detection, a quantity, understood by the UE, of carriers having PDSCHs is less than an actual quantity of carriers, of an eNB, that send PDSCHs. The UE feeds back an HARQ-ACK for a PDSCH detected by the UE itself. However, the base station cannot correctly decode the HARQ-ACK fed back by the UE.

SUMMARY

Embodiments of the present disclosure provide a method for sending control information, user equipment, and a base station, so as to resolve a problem that because of missed detection of the user equipment, the base station cannot correctly decode a hybrid automatic repeat request response message fed back by the user equipment.

According to a first aspect, an embodiment of the present disclosure provides user equipment, and the user equipment includes a receiving module, configured to receive at least one piece of first downlink control information sent by a base station, where each piece of first downlink control information carries a downlink assignment index, and at least one piece of the first downlink control information further carries a total downlink assignment index. The user equipment also includes a processing module, configured to generate a hybrid automatic repeat request response message according to the total downlink assignment index, the downlink assignment index of each piece of first downlink control information, and a physical downlink shared channel corresponding to each piece of first downlink control information. Additionally, the user equipment includes a sending module, configured to send the hybrid automatic repeat request response message to the base station, where each downlink assignment index is used to indicate an index of a physical downlink shared channel corresponding to downlink control information carrying the downlink assignment index, or is used to indicate an index of a physical downlink control channel indicating downlink semi-persistent scheduling release, or is used to indicate an index of a physical downlink shared channel corresponding to downlink control information carrying the downlink assignment index and a physical downlink control channel indicating downlink semi-persistent scheduling release. The total downlink assignment index is a quantity of physical downlink shared channels corresponding to all downlink control information, or a quantity of physical downlink control channels indicating downlink semi-persistent scheduling release, or a sum of a quantity of physical downlink shared channels corresponding to all the downlink control information and a quantity of physical downlink control channels indicating downlink semi-persistent scheduling release.

With reference to the first aspect, in a first possible implementation manner of the first aspect, that the processing module is configured to generate a hybrid automatic repeat request response message according to the total downlink assignment index, the downlink assignment index of each piece of first downlink control information, and a physical downlink shared channel corresponding to each piece of first downlink control information includes: separately generating, according to whether the physical downlink shared channel corresponding to each piece of first downlink control information is correctly decoded, response information for the physical downlink shared channel corresponding to each piece of first downlink control information; obtaining a sorting result by sorting the downlink assignment indexes of all the first downlink control information, determining second downlink control information according to the sorting result and the total downlink assignment index, and obtaining a downlink assignment index of the second downlink control information, where response information for a physical downlink shared channel corresponding to the second downlink control information is a negative acknowledgment (NACK); and generating the hybrid automatic repeat request response message according to the response information for the physical downlink shared channel corresponding to each piece of first downlink control information and the response information for the physical downlink shared channel corresponding to the second downlink control information, where an arrangement order of the response information for the physical downlink shared channel corresponding to each piece of first downlink control information and the response information for the physical downlink shared channel corresponding to the second downlink control information is the same as an order of the downlink assignment index of each piece of first downlink control information and the downlink assignment index of the second downlink control information, where the response information for the physical downlink shared channel corresponding to each piece of first downlink control information and the response information for the physical downlink shared channel corresponding to the second downlink control information are in the hybrid automatic repeat request response message.

With reference to the first aspect or the first possible implementation manner of the first aspect, in a second possible implementation manner of the first aspect, that the receiving module is configured to receive at least one piece of first downlink control information sent by a base station, where each piece of first downlink control information carries a downlink assignment index, and at least one piece of the first downlink control information further carries a total downlink assignment index includes: setting a first carrier quantity threshold, receiving the at least one piece of first downlink control information sent by the base station, and obtaining the downlink assignment index of each piece of first downlink control information; and if a carrier number of a carrier corresponding to the first downlink control information is greater than the first carrier quantity threshold, obtaining the total downlink assignment index in a transmit power control (TPC) field in the first downlink control information.

With reference to any one of the first aspect, or the first or the second possible implementation manner of the first aspect, in a third possible implementation manner of the first aspect, the receiving module is further configured to: receive a quantity of configured carriers that is sent by the base station; and that the sending module is configured to send the hybrid automatic repeat request response message to the base station includes: if the quantity of configured carriers is greater than the first threshold, sending the hybrid automatic repeat request response message to the base station by using a physical uplink control channel format 4; or if the quantity of configured carriers is less than or equal to the first threshold, sending the hybrid automatic repeat request response message to the base station by using a physical uplink control channel format 3.

With reference to any one of the first aspect, or the first or the second possible implementation manner of the first aspect, in a fourth possible implementation manner of the first aspect, the receiving module is further configured to: obtain a hybrid automatic repeat request response message bit quantity threshold supported on a pre-defined physical uplink control channel; and that the sending module is configured to send the hybrid automatic repeat request response message to the base station includes: if the total downlink assignment index is greater than the hybrid automatic repeat request response message bit quantity threshold supported on the physical uplink control channel, sending the hybrid automatic repeat request response message to the base station by using a physical uplink control channel format 4; or if the total downlink assignment index is less than or equal to the hybrid automatic repeat request response message bit quantity threshold supported on the physical uplink control channel, sending the hybrid automatic repeat request response message to the base station by using a physical uplink control channel format 3.

With reference to any one of the second to the fourth possible implementation manners of the first aspect, in a fifth possible implementation manner of the first aspect, if there are multiple pieces of the first downlink control information corresponding to carriers whose carrier numbers are greater than the first carrier quantity threshold, that the receiving module is configured to obtain the total downlink assignment index in a TPC field in the first downlink control information includes: obtaining the total downlink assignment index in TPC fields in some of the first downlink control information, or obtaining a physical uplink control channel (PUCCH) format 4 resource indicator in TPC fields in some of the first downlink control information.

With reference to the fifth possible implementation manner of the first aspect, in a sixth possible implementation manner of the first aspect, that the receiving module is configured to: obtain the total downlink assignment index in TPC fields in some of the first downlink control information, or obtain a PUCCH format 4 resource indicator in TPC fields in some of the first downlink control information includes: obtaining the total downlink assignment index in the TPC field in the first downlink control information if the carrier number of the carrier corresponding to the first downlink control information is greater than the first carrier quantity threshold, and parity of the carrier number of the carrier corresponding to the first downlink control information is the same as that of the first carrier quantity threshold; or obtaining the PUCCH format 4 resource indicator in the TPC field in the first downlink control information if the carrier number of the carrier corresponding to the first downlink control information is greater than the first carrier quantity threshold, and parity of the carrier number of the carrier corresponding to the first downlink control information is different from that of the first carrier quantity threshold.

With reference to the first aspect or the first possible implementation manner of the first aspect, in a seventh possible implementation manner of the first aspect, that the receiving module is configured to receive at least one piece of first downlink control information sent by a base station, where each piece of first downlink control information carries a downlink assignment index, and at least one piece of the first downlink control information further carries a total downlink assignment index includes: setting a second threshold, receiving the at least one piece of first downlink control information sent by the base station, and obtaining the downlink assignment index of each piece of first downlink control information; and if the downlink assignment index of the downlink control information is greater than the second threshold, obtaining the total downlink assignment index in a TPC field in the first downlink control information corresponding to the downlink assignment index.

With reference to the seventh possible implementation manner of the first aspect, in an eighth possible implementation manner of the first aspect, if there are multiple pieces of first downlink control information whose downlink assignment indexes are greater than the second threshold, that the receiving module is configured to obtain the total downlink assignment index in a TPC field in the first downlink control information corresponding to the downlink assignment index includes: obtaining the total downlink assignment index in TPC fields in some of the first downlink control information, or obtaining a PUCCH format 4 resource indicator in TPC fields in some of the first downlink control information.

With reference to the eighth possible implementation manner of the first aspect, in a ninth possible implementation manner of the first aspect, that the receiving module is configured to: obtain the total downlink assignment index in TPC fields in some of the first downlink control information, or obtain a PUCCH format 4 resource indicator in TPC fields in some of the first downlink control information includes: obtaining the total downlink assignment index in the TPC field in the first downlink control information if the downlink assignment index of the first downlink control information is greater than the second threshold, and parity of the downlink assignment index is the same as that of the second threshold; or obtaining the PUCCH format 4 resource indicator in the TPC field in the first downlink control information if the downlink assignment index of the first downlink control information is greater than the second threshold, and parity of the downlink assignment index is different from that of the second threshold.

With reference to the first aspect or the first possible implementation manner of the first aspect, in a tenth possible implementation manner of the first aspect, that the receiving module is configured to receive at least one piece of first downlink control information sent by a base station, where each piece of first downlink control information carries a downlink assignment index, and at least one piece of the first downlink control information further carries a total downlink assignment index includes: receiving the at least one piece of first downlink control information sent by the base station, obtaining the downlink assignment index of each piece of first downlink control information, and obtaining the total downlink assignment index in a total downlink assignment index field in each piece of first downlink control information.

With reference to the first aspect or the first possible implementation manner of the first aspect, in an eleventh possible implementation manner of the first aspect, that the receiving module is configured to receive at least one piece of downlink control information sent by a base station, where each piece of first downlink control information carries a downlink assignment index, and at least one piece of the first downlink control information further carries a total downlink assignment index includes: receiving the at least one piece of first downlink control information sent by the base station, obtaining the downlink assignment index of each piece of first downlink control information, and obtaining the total downlink assignment index in a total downlink assignment index field in first downlink control information carried by a primary component carrier.

With reference to the first aspect or the first possible implementation manner of the first aspect, in a twelfth possible implementation manner of the first aspect, that the receiving module is configured to receive at least one piece of first downlink control information sent by a base station, where each piece of first downlink control information carries a downlink assignment index, and at least one piece of the first downlink control information further carries a total downlink assignment index includes: receiving the at least one piece of first downlink control information sent by the base station; and if special scrambling processing is performed on a cyclic redundancy check (CRC) code of the first downlink control information, performing descrambling processing on the first downlink control information, and obtaining the total downlink assignment index and a downlink assignment index of the first downlink control information.

According to a second aspect, an embodiment of the present disclosure provides a base station, and the base station includes a sending module, configured to send at least one piece of downlink control information to user equipment, where each piece of downlink control information carries a downlink assignment index, and at least one piece of the downlink control information further carries a total downlink assignment index. The base station also includes a receiving module, configured to receive a hybrid automatic repeat request response message sent by the user equipment according to the total downlink assignment index, a downlink assignment index of each piece of first downlink control information, and a physical downlink shared channel corresponding to each piece of first downlink control information. Additionally, the base station includes a processing module, configured to obtain, according to the hybrid automatic repeat request response message, response information for a physical downlink shared channel corresponding to each piece of downlink control information, where the downlink control information includes the first downlink control information and second downlink control information. Each downlink assignment index is used to indicate an index of a physical downlink shared channel corresponding to downlink control information carrying the downlink assignment index, or is used to indicate an index of a physical downlink control channel indicating downlink semi-persistent scheduling release, or is used to indicate an index of a physical downlink shared channel corresponding to downlink control information carrying the downlink assignment index and a physical downlink control channel indicating downlink semi-persistent scheduling release. Also, the total downlink assignment index is a quantity of physical downlink shared channels corresponding to all the downlink control information, or a quantity of physical downlink control channels indicating downlink semi-persistent scheduling release, or a sum of a quantity of physical downlink shared channels corresponding to all the downlink control information and a quantity of physical downlink control channels indicating downlink semi-persistent scheduling release.

With reference to the second aspect, in a first possible implementation manner of the second aspect, that the sending module is configured to send at least one piece of downlink control information to user equipment, where each piece of downlink control information carries a downlink assignment index, and at least one piece of the downlink control information further carries a total downlink assignment index includes: separately setting the downlink assignment index of each piece of downlink control information in each piece of downlink control information; if a carrier number of a carrier corresponding to the downlink control information is greater than a first carrier quantity threshold, setting the total downlink assignment index in a TPC field in the downlink control information; and sending at least one piece of the downlink control information to the user equipment.

With reference to the first possible implementation manner of the second aspect, in a second possible implementation manner of the second aspect, if there are multiple pieces of the downlink control information corresponding to carriers whose carrier numbers are greater than the first carrier quantity threshold, that the sending module is configured to set the total downlink assignment index in a TPC field in the downlink control information includes: setting the total downlink assignment index in TPC fields in some of the downlink control information, or setting a physical uplink control channel (PUCCH) format 4 resource indicator in TPC fields in some of the downlink control information.

With reference to the second possible implementation manner of the second aspect, in a third possible implementation manner of the second aspect, that the sending module is configured to: set the total downlink assignment index in TPC fields in some of the downlink control information, or set a PUCCH format 4 resource indicator in TPC fields in some of the downlink control information includes: setting the total downlink assignment index in the TPC field in the downlink control information if the carrier number of the carrier corresponding to the downlink control information is greater than the first carrier quantity threshold, and parity of the carrier number of the carrier corresponding to the downlink control information is the same as that of the first carrier quantity threshold; or setting the PUCCH format 4 resource indicator in the TPC field in the downlink control information if the carrier number of the carrier corresponding to the downlink control information is greater than the first carrier quantity threshold, and parity of the carrier number of the carrier corresponding to the downlink control information is different from that of the first carrier quantity threshold.

With reference to the second aspect, in a fourth possible implementation manner of the second aspect, that the sending module is configured to send at least one piece of downlink control information to user equipment, where each piece of downlink control information carries a downlink assignment index, and at least one piece of the downlink control information further carries a total downlink assignment index includes: separately setting the downlink assignment index of each piece of downlink control information in each piece of downlink control information; if a downlink assignment index of downlink control information is greater than a second threshold, setting the total downlink assignment index in a TPC field in the downlink control information; and sending at least one piece of the downlink control information to the user equipment.

With reference to the fourth possible implementation manner of the second aspect, in a fifth possible implementation manner of the second aspect, if there are multiple pieces of downlink control information whose downlink assignment indexes are greater than the second threshold, that the sending module is configured to set the total downlink assignment index in a TPC field in the downlink control information includes: setting the total downlink assignment index in TPC fields in some of the downlink control information, or setting a PUCCH format 4 resource indicator in TPC fields in some of the downlink control information.

With reference to the fifth possible implementation manner of the second aspect, in a sixth possible implementation manner of the second aspect, that the sending module is configured to: set the total downlink assignment index in TPC fields in some of the downlink control information, or set a PUCCH format 4 resource indicator in TPC fields in some of the downlink control information includes: setting the total downlink assignment index in the TPC field in the downlink control information if the downlink assignment index of the downlink control information is greater than the second threshold, and parity of the downlink assignment index is the same as that of the second threshold; or setting the PUCCH format 4 resource indicator in the TPC field in the downlink control information if the downlink assignment index of the downlink control information is greater than the second threshold, and parity of the downlink assignment index is different from that of the second threshold.

With reference to the second aspect, in a seventh possible implementation manner of the second aspect, that the sending module is configured to send at least one piece of downlink control information to user equipment, where each piece of downlink control information carries a downlink assignment index, and at least one piece of the downlink control information further carries a total downlink assignment index includes: separately setting the downlink assignment index of each piece of downlink control information in each piece of downlink control information, setting the total downlink assignment index in a total downlink assignment index field in each piece of downlink control information, and sending at least one piece of the downlink control information to the user equipment.

With reference to the second aspect, in an eighth possible implementation manner of the second aspect, that the sending module is configured to send at least one piece of downlink control information to user equipment, where each piece of downlink control information carries a downlink assignment index, and at least one piece of the downlink control information further carries a total downlink assignment index includes: separately setting the downlink assignment index of each piece of downlink control information in each piece of downlink control information, setting the total downlink assignment index in a total downlink assignment index field in downlink control information carried by a primary component carrier, and sending at least one piece of the downlink control information to the user equipment.

With reference to the second aspect, in a ninth possible implementation manner of the second aspect, that the sending module is configured to send at least one piece of downlink control information to user equipment, where each piece of downlink control information carries a downlink assignment index, and at least one piece of the downlink control information further carries a total downlink assignment index includes: setting the total downlink assignment index in at least one piece of downlink control information, and performing special scrambling processing on a CRC code of downlink control information carrying the total downlink assignment index, so as to obtain the scrambled downlink control information; and sending, to the user equipment, the scrambled downlink control information and downlink control information on which scrambling processing is not performed, where both the scrambled downlink control information and the downlink control information on which scrambling processing is not performed carry a downlink assignment index.

With reference to any one of the second aspect, or the first to the ninth possible implementation manners of the second aspect, in a tenth possible implementation manner of the second aspect, if a quantity of bits occupied by the total downlink assignment index is less than 5 bits, a status quantity corresponding to the quantity of bits occupied by the total downlink assignment index is obtained; a status corresponding to the total downlink assignment index is obtained by obtaining a remainder of the total downlink assignment index divided by the status quantity; and the total downlink assignment index is represented by using the status corresponding to the total downlink assignment index.

According to a third aspect, an embodiment of the present disclosure provides a method for sending control information, and the method includes: receiving at least one piece of first downlink control information sent by a base station, where each piece of first downlink control information carries a downlink assignment index, and at least one piece of the first downlink control information further carries a total downlink assignment index; generating a hybrid automatic repeat request response message according to the total downlink assignment index, the downlink assignment index of each piece of first downlink control information, and a physical downlink shared channel corresponding to each piece of first downlink control information; and sending the hybrid automatic repeat request response message to the base station, where each downlink assignment index is used to indicate an index of a physical downlink shared channel corresponding to downlink control information carrying the downlink assignment index, or is used to indicate an index of a physical downlink control channel indicating downlink semi-persistent scheduling release, or is used to indicate an index of a physical downlink shared channel corresponding to downlink control information carrying the downlink assignment index and a physical downlink control channel indicating downlink semi-persistent scheduling release; and the total downlink assignment index is a quantity of physical downlink shared channels corresponding to all downlink control information, or a quantity of physical downlink control channels indicating downlink semi-persistent scheduling release, or a sum of a quantity of physical downlink shared channels corresponding to all the downlink control information and a quantity of physical downlink control channels indicating downlink semi-persistent scheduling release.

With reference to the third aspect, in a first possible implementation manner of the third aspect, the generating a hybrid automatic repeat request response message according to the total downlink assignment index, the downlink assignment index of each piece of first downlink control information, and a physical downlink shared channel corresponding to each piece of first downlink control information includes: separately generating, according to whether the physical downlink shared channel corresponding to each piece of first downlink control information is correctly decoded, response information for the physical downlink shared channel corresponding to each piece of first downlink control information; obtaining a sorting result by sorting the downlink assignment indexes of all the first downlink control information, determining second downlink control information according to the sorting result and the total downlink assignment index, and obtaining a downlink assignment index of the second downlink control information, where response information for a physical downlink shared channel corresponding to the second downlink control information is a NACK; and generating the hybrid automatic repeat request response message according to the response information for the physical downlink shared channel corresponding to each piece of first downlink control information and the response information for the physical downlink shared channel corresponding to the second downlink control information, where an arrangement order of the response information for the physical downlink shared channel corresponding to each piece of first downlink control information and the response information for the physical downlink shared channel corresponding to the second downlink control information is the same as an order of the downlink assignment index of each piece of first downlink control information and the downlink assignment index of the second downlink control information, where the response information for the physical downlink shared channel corresponding to each piece of first downlink control information and the response information for the physical downlink shared channel corresponding to the second downlink control information are in the hybrid automatic repeat request response message.

With reference to the third aspect or the first possible implementation manner of the third aspect, in a second possible implementation manner of the third aspect, the receiving at least one piece of first downlink control information sent by a base station, where each piece of first downlink control information carries a downlink assignment index, and at least one piece of the first downlink control information further carries a total downlink assignment index includes: setting a first carrier quantity threshold, receiving the at least one piece of first downlink control information sent by the base station, and obtaining the downlink assignment index of each piece of first downlink control information; and if a carrier number of a carrier corresponding to the first downlink control information is greater than the first carrier quantity threshold, obtaining the total downlink assignment index in a TPC field in the first downlink control information.

With reference to any one of the third aspect, or the first or the second possible implementation manner of the third aspect, in a third possible implementation manner of the third aspect, the method further includes: receiving a quantity of configured carriers that is sent by the base station; and the sending the hybrid automatic repeat request response message to the base station includes: if the quantity of configured carriers is greater than the first threshold, sending the hybrid automatic repeat request response message to the base station by using a physical uplink control channel format 4; or if the quantity of configured carriers is less than or equal to the first threshold, sending the hybrid automatic repeat request response message to the base station by using a physical uplink control channel format 3.

With reference to any one of the third aspect, or the first or the second possible implementation manner of the third aspect, in a fourth possible implementation manner of the third aspect, the method further includes: obtaining a hybrid automatic repeat request response message bit quantity threshold supported on a pre-defined physical uplink control channel; and the sending the hybrid automatic repeat request response message to the base station includes: if the total downlink assignment index is greater than the hybrid automatic repeat request response message bit quantity threshold supported on the physical uplink control channel, sending the hybrid automatic repeat request response message to the base station by using a physical uplink control channel format 4; or if the total downlink assignment index is less than or equal to the hybrid automatic repeat request response message bit quantity threshold supported on the physical uplink control channel, sending the hybrid automatic repeat request response message to the base station by using a physical uplink control channel format 3.

With reference to any one of the second to the fourth possible implementation manners of the third aspect, in a fifth possible implementation manner of the third aspect, if there are multiple pieces of the first downlink control information corresponding to carriers whose carrier numbers are greater than the first carrier quantity threshold, the obtaining the total downlink assignment index in a TPC field in the first downlink control information includes: obtaining the total downlink assignment index in TPC fields in some of the first downlink control information, or obtaining a PUCCH format 4 resource indicator in TPC fields in some of the first downlink control information.

With reference to the fifth possible implementation manner of the third aspect, in a sixth possible implementation manner of the third aspect, the obtaining the total downlink assignment index in TPC fields in some of the first downlink control information, or obtaining a PUCCH format 4 resource indicator in TPC fields in some of the first downlink control information includes: obtaining the total downlink assignment index in the TPC field in the first downlink control information if the carrier number of the carrier corresponding to the first downlink control information is greater than the first carrier quantity threshold, and parity of the carrier number of the carrier corresponding to the first downlink control information is the same as that of the first carrier quantity threshold; or obtaining the PUCCH format 4 resource indicator in the TPC field in the first downlink control information if the carrier number of the carrier corresponding to the first downlink control information is greater than the first carrier quantity threshold, and parity of the carrier number of the carrier corresponding to the first downlink control information is different from that of the first carrier quantity threshold.

With reference to the third aspect or the first possible implementation manner of the third aspect, in a seventh possible implementation manner of the third aspect, the receiving at least one piece of first downlink control information sent by a base station, where each piece of first downlink control information carries a downlink assignment index, and at least one piece of the first downlink control information further carries a total downlink assignment index includes: setting a second threshold, receiving the at least one piece of first downlink control information sent by the base station, and obtaining the downlink assignment index of each piece of first downlink control information; and if the downlink assignment index of the downlink control information is greater than the second threshold, obtaining the total downlink assignment index in a TPC field in the first downlink control information corresponding to the downlink assignment index.

With reference to the seventh possible implementation manner of the third aspect, in an eighth possible implementation manner of the third aspect, if there are multiple pieces of first downlink control information whose downlink assignment indexes are greater than the second threshold, the obtaining the total downlink assignment index in a TPC field in the first downlink control information corresponding to the downlink assignment index includes: obtaining the total downlink assignment index in TPC fields in some of the first downlink control information, or obtaining a PUCCH format 4 resource indicator in TPC fields in some of the first downlink control information.

With reference to the eighth possible implementation manner of the third aspect, in a ninth possible implementation manner of the third aspect, the obtaining the total downlink assignment index in TPC fields in some of the first downlink control information, or obtaining a PUCCH format 4 resource indicator in TPC fields in some of the first downlink control information includes: obtaining the total downlink assignment index in the TPC field in the first downlink control information if the downlink assignment index of the first downlink control information is greater than the second threshold, and parity of the downlink assignment index is the same as that of the second threshold; or obtaining the PUCCH format 4 resource indicator in the TPC field in the first downlink control information if the downlink assignment index of the first downlink control information is greater than the second threshold, and parity of the downlink assignment index is different from that of the second threshold.

With reference to the third aspect or the first possible implementation manner of the third aspect, in a tenth possible implementation manner of the third aspect, the receiving at least one piece of first downlink control information sent by a base station, where each piece of first downlink control information carries a downlink assignment index, and at least one piece of the first downlink control information further carries a total downlink assignment index includes: receiving the at least one piece of first downlink control information sent by the base station, obtaining the downlink assignment index of each piece of first downlink control information, and obtaining the total downlink assignment index in a total downlink assignment index field in each piece of first downlink control information.

With reference to the third aspect or the first possible implementation manner of the third aspect, in an eleventh possible implementation manner of the third aspect, the receiving at least one piece of downlink control information sent by a base station, where each piece of first downlink control information carries a downlink assignment index, and at least one piece of the first downlink control information further carries a total downlink assignment index includes: receiving the at least one piece of first downlink control information sent by the base station, obtaining the downlink assignment index of each piece of first downlink control information, and obtaining the total downlink assignment index in a total downlink assignment index field in first downlink control information carried by a primary component carrier.

With reference to the third aspect or the first possible implementation manner of the third aspect, in a twelfth possible implementation manner of the third aspect, the receiving at least one piece of first downlink control information sent by a base station, where each piece of first downlink control information carries a downlink assignment index, and at least one piece of the first downlink control information further carries a total downlink assignment index includes: receiving the at least one piece of first downlink control information sent by the base station; and if special scrambling processing is performed on a CRC code of the first downlink control information, performing descrambling processing on the first downlink control information, and obtaining the total downlink assignment index and a downlink assignment index of the first downlink control information.

According to a fourth aspect, an embodiment of the present disclosure provides a method for sending control information, and the method includes: sending at least one piece of downlink control information to user equipment, where each piece of downlink control information carries a downlink assignment index, and at least one piece of the downlink control information further carries a total downlink assignment index; receiving a hybrid automatic repeat request response message sent by the user equipment according to the total downlink assignment index, a downlink assignment index of each piece of first downlink control information, and a physical downlink shared channel corresponding to each piece of first downlink control information; and obtaining, according to the hybrid automatic repeat request response message, response information for a physical downlink shared channel corresponding to each piece of downlink control information, where the downlink control information includes the first downlink control information and second downlink control information; each downlink assignment index is used to indicate an index of a physical downlink shared channel corresponding to downlink control information carrying the downlink assignment index, or is used to indicate an index of a physical downlink control channel indicating downlink semi-persistent scheduling release, or is used to indicate an index of a physical downlink shared channel corresponding to downlink control information carrying the downlink assignment index and a physical downlink control channel indicating downlink semi-persistent scheduling release; and the total downlink assignment index is a quantity of physical downlink shared channels corresponding to all the downlink control information, or a quantity of physical downlink control channels indicating downlink semi-persistent scheduling release, or a sum of a quantity of physical downlink shared channels corresponding to all the downlink control information and a quantity of physical downlink control channels indicating downlink semi-persistent scheduling release.

With reference to the fourth aspect, in a first possible implementation manner of the fourth aspect, the sending at least one piece of downlink control information to user equipment, where each piece of downlink control information carries a downlink assignment index, and at least one piece of the downlink control information further carries a total downlink assignment index includes: separately setting the downlink assignment index of each piece of downlink control information in each piece of downlink control information; if a carrier number of a carrier corresponding to the downlink control information is greater than a first carrier quantity threshold, setting the total downlink assignment index in a TPC field in the downlink control information; and sending at least one piece of the downlink control information to the user equipment.

With reference to the first possible implementation manner of the fourth aspect, in a second possible implementation manner of the fourth aspect, if there are multiple pieces of the downlink control information corresponding to carriers whose carrier numbers are greater than the first carrier quantity threshold, the setting the total downlink assignment index in a TPC field in the downlink control information includes: setting the total downlink assignment index in TPC fields in some of the downlink control information, or setting a PUCCH format 4 resource indicator in TPC fields in some of the downlink control information.

With reference to the second possible implementation manner of the fourth aspect, in a third possible implementation manner of the fourth aspect, the setting the total downlink assignment index in TPC fields in some of the downlink control information, or setting a PUCCH format 4 resource indicator in TPC fields in some of the downlink control information includes: setting the total downlink assignment index in the TPC field in the downlink control information if the carrier number of the carrier corresponding to the downlink control information is greater than the first carrier quantity threshold, and parity of the carrier number of the carrier corresponding to the downlink control information is the same as that of the first carrier quantity threshold; or setting the PUCCH format 4 resource indicator in the TPC field in the downlink control information if the carrier number of the carrier corresponding to the downlink control information is greater than the first carrier quantity threshold, and parity of the carrier number of the carrier corresponding to the downlink control information is different from that of the first carrier quantity threshold.

With reference to the fourth aspect, in a fourth possible implementation manner of the fourth aspect, the sending at least one piece of downlink control information to user equipment, where each piece of downlink control information carries a downlink assignment index, and at least one piece of the downlink control information further carries a total downlink assignment index includes: separately setting the downlink assignment index of each piece of downlink control information in each piece of downlink control information; if a downlink assignment index of downlink control information is greater than a second threshold, setting the total downlink assignment index in a TPC field in the downlink control information; and sending at least one piece of the downlink control information to the user equipment.

With reference to the fourth possible implementation manner of the fourth aspect, in a fifth possible implementation manner of the fourth aspect, if there are multiple pieces of downlink control information whose downlink assignment indexes are greater than the second threshold, the setting the total downlink assignment index in a TPC field in the downlink control information includes: setting the total downlink assignment index in TPC fields in some of the downlink control information, or setting a PUCCH format 4 resource indicator in TPC fields in some of the downlink control information.

With reference to the fifth possible implementation manner of the fourth aspect, in a sixth possible implementation manner of the fourth aspect, the setting the total downlink assignment index in TPC fields in some of the downlink control information, or setting a PUCCH format 4 resource indicator in TPC fields in some of the downlink control information includes: setting the total downlink assignment index in the TPC field in the downlink control information if the downlink assignment index of the downlink control information is greater than the second threshold, and parity of the downlink assignment index is the same as that of the second threshold; or setting the PUCCH format 4 resource indicator in the TPC field in the downlink control information if the downlink assignment index of the downlink control information is greater than the second threshold, and parity of the downlink assignment index is different from that of the second threshold.

With reference to the fourth aspect, in a seventh possible implementation manner of the fourth aspect, the sending at least one piece of downlink control information to user equipment, where each piece of downlink control information carries a downlink assignment index, and at least one piece of the downlink control information further carries a total downlink assignment index includes: separately setting the downlink assignment index of each piece of downlink control information in each piece of downlink control information, setting the total downlink assignment index in a total downlink assignment index field in each piece of downlink control information, and sending at least one piece of the downlink control information to the user equipment.

With reference to the fourth aspect, in an eighth possible implementation manner of the fourth aspect, the sending at least one piece of downlink control information to user equipment, where each piece of downlink control information carries a downlink assignment index, and at least one piece of the downlink control information further carries a total downlink assignment index includes: separately setting the downlink assignment index of each piece of downlink control information in each piece of downlink control information, setting the total downlink assignment index in a total downlink assignment index field in downlink control information carried by a primary component carrier, and sending at least one piece of the downlink control information to the user equipment.

With reference to the fourth aspect, in a ninth possible implementation manner of the fourth aspect, the sending at least one piece of downlink control information to user equipment, where each piece of downlink control information carries a downlink assignment index, and at least one piece of the downlink control information further carries a total downlink assignment index includes: setting the total downlink assignment index in at least one piece of downlink control information, and performing special scrambling processing on a CRC code of downlink control information carrying the total downlink assignment index, so as to obtain the scrambled downlink control information; and sending, to the user equipment, the scrambled downlink control information and downlink control information on which scrambling processing is not performed, where both the scrambled downlink control information and the downlink control information on which scrambling processing is not performed carry a downlink assignment index.

With reference to any one of the fourth aspect, or the first to the ninth possible implementation manners of the fourth aspect, in a tenth possible implementation manner of the fourth aspect, if a quantity of bits occupied by the total downlink assignment index is less than 5 bits, a status quantity corresponding to the quantity of bits occupied by the total downlink assignment index is obtained; a status corresponding to the total downlink assignment index is obtained by obtaining a remainder of the total downlink assignment index divided by the status quantity; and the total downlink assignment index is represented by using the status corresponding to the total downlink assignment index.

According to the method for sending control information, the user equipment, and the apparatus in the embodiments of the present disclosure, a receiving module of the user equipment receives at least one piece of first downlink control information sent by a base station, where each piece of first downlink control information carries a downlink assignment index, and the at least one piece of first downlink control information further carries a total downlink assignment index; and a processing module of the user equipment can determine, according to the total downlink assignment index and the downlink assignment index of each piece of first downlink control information, downlink control information missed by the user equipment itself, and further generate a hybrid automatic repeat request response message with reference to a physical downlink shared channel corresponding to each piece of received first downlink control information, where the hybrid automatic repeat request response message includes response information of the user equipment for all downlink control information sent by the base station. Therefore, the base station can correctly decode the hybrid automatic repeat request response message. In addition, the user equipment in the embodiments can effectively reduce a useless information feedback by the user equipment, and further improve transmission performance of uplink control information.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION OF ILLUSTRATIVE EMBODIMENTS

Figure 1:
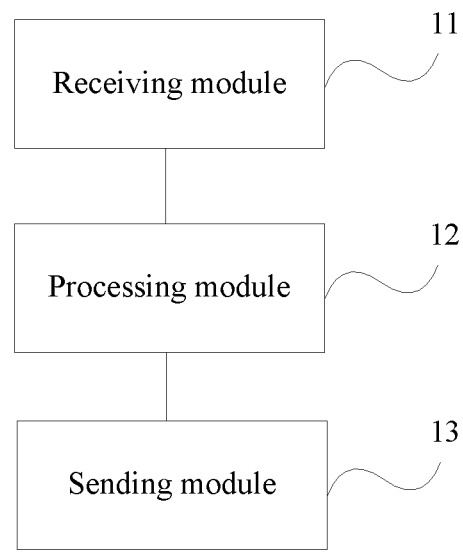
FIG. 1 is a schematic structural diagram of a first user equipment embodiment according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

The embodiments of the present disclosure relate to control information sending between a base station and user equipment, and are mainly based on a current carrier aggregation architecture. Specifically, the base station delivers control information to the user equipment, and the control information may carry scheduling information. The user equipment performs data receiving or sending processing according to the scheduling information, and sends a feedback processing result to the base station by using a physical uplink control channel (PUCCH). In a carrier aggregation mode in a current long term evolution (LTE) technology, a PUCCH sending mode includes two modes: a channel selection mode and a PUCCH format 3. In the channel selection mode, an acknowledgement (ACK)/negative acknowledgment (NACK) feedback is performed by using a PUCCH format 1a/1b. However, the channel selection mode supports carrier aggregation of a maximum of two carriers, and therefore, is relatively limited in a carrier aggregation (CA) mode application scenario. The PUCCH format 3 mode uses a discrete Fourier transform spread orthogonal frequency division multiplexing (DFT-S-OFDM) sending structure, and can support transmission of a maximum of 20 ACKs/NACKs and can support time division duplex (TDD) CA of five carriers. A mainstream TDD uplink-downlink configuration 2 deployed on a current TDD network is used as an example. Specifically, for different TDD uplink-downlink configurations in an LTE system, refer to Table 1. For a time sequence relationship between a physical downlink shared channel (PDSCH) in a TDD system and an ACK/NACK corresponding to the PDSCH, refer to Table 2. An uplink subframe 2 of one carrier can support a feedback of four ACK/NACK bits, and CA of five carriers with the TDD uplink-downlink configuration 2 is 20 ACK/NACK bits. With further evolution, it is now being taken into consideration that the LTE technology supports an aggregation scenario of 32 carriers. For example, for TDD carrier aggregation, if a TDD uplink-downlink configuration of a primary component carrier is 2, and uplink-downlink configurations of four secondary component carriers are all 5, 4+9*4=40 bits of ACK/NACK need to be fed back. In a TDD-FDD carrier aggregation scenario, a TDD carrier is a primary component carrier and a configuration is a TDD configuration 5, and other carriers are frequency division duplex (FDD) carriers. A maximum quantity of ACK/NACK bits that need to be fed back on an uplink primary component carrier is 9+10*31=319 bits. That is, if an hybrid automatic repeat request (HARQ)-ACK that needs to be fed back is still based on a quantity of configured carriers, for a user for whom 32 carriers are configured, 319 bits always need to be fed back. Actually, when only one subframe, on one carrier, in a downlink subframe set corresponding to a particular downlink subframe is scheduled, 319 bits still need to be fed back. Only 1 bit of the 319 bits is useful information, and other bits are unnecessary overheads. In addition, when HARQ-ACK bits exceed a specified bit quantity (such as 20), performance obtained by still using linear block code such as Reed Muller (RM) code is not good, so that a probability of using convolutional code is higher. However, when the convolutional code is used, a cyclic redundancy check (CRC) generally needs to be added. If the CRC is added, the convolutional code cannot be used to perform maximum likelihood detection by using priori information (HARQ-ACK bits corresponding to carriers that are not scheduled are known and can be used as the priori information) to improve decoding performance in a way as the linear block code does. Therefore, a quantity of codebooks required for an HARQ-ACK feedback is determined based on a quantity of carriers in a configured-carrier set. If a quantity (that is, a total information bit quantity) of codebooks for an HARQ-ACK feedback on multiple downlink carriers is obtained by means of calculation based on a semi-statically configured downlink component carrier (DL CC) set in a system or a quantity of carriers in an active carrier set, consequently, the user equipment (UE) generally uses padding bits (such as bits 0) as original information bits for multiple downlink carriers on which corresponding HARQ-ACKs do not need to be fed back, and performs joint coding on the padding bits and an original information bit for a downlink carrier on which uplink control information (UCI) actually needs to be fed back, so as to perform transmission on one PUCCH or physical uplink shared channel (PUSCH), which not only wastes power to transmit useless information, but also deteriorates transmission performance of the UCI that actually needs to be fed back. In the present disclosure, a method for sending control information in the following embodiments can be used to effectively resolve the foregoing problem. For a specific implementation manner, refer to detailed explanation and description in the following embodiments.

TABLE 1

Different TDD uplink-downlink configurations in an LTE system

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

TABLE 2

Time sequence relationship between a PDSCH and an ACK/NACK corresponding to the PDSCH in a TDD system

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 1 is a schematic structural diagram of a first user equipment embodiment according to the present disclosure. As shown in FIG. 1, user equipment in this embodiment may include a receiving module 11, a processing module 12, and a sending module 13. The receiving module 11 is configured to receive at least one piece of first downlink control information sent by a base station, where each piece of first downlink control information carries a downlink assignment index, and at least one piece of the first downlink control information further carries a total downlink assignment index. The processing module 12 is configured to generate a hybrid automatic repeat request response message according to the total downlink assignment index, the downlink assignment index of each piece of first downlink control information, and a physical downlink shared channel corresponding to each piece of first downlink control information. The sending module 13 is configured to send the hybrid automatic repeat request response message to the base station.

The total downlink assignment index is a quantity of physical downlink shared channels corresponding to all downlink control information, or a quantity of physical downlink control channels indicating downlink semi-persistent scheduling release, or a sum of a quantity of physical downlink shared channels corresponding to all the downlink control information and a quantity of physical downlink control channels indicating downlink semi-persistent scheduling release.

Each downlink assignment index is used to indicate an index of a physical downlink shared channel corresponding to downlink control information carrying the downlink assignment index, or is used to indicate an index of a physical downlink control channel indicating downlink semi-persistent scheduling release, or is used to indicate an index of a physical downlink shared channel corresponding to downlink control information carrying the downlink assignment index and a physical downlink control channel indicating downlink semi-persistent scheduling release.

Specifically, the downlink assignment index of each piece of first downlink control information sent by the base station indicates an index of the physical downlink shared channel corresponding to the first downlink control information; correspondingly, the total downlink assignment index is a quantity of physical downlink shared channels corresponding to all the first downlink control information. Alternatively, some of downlink assignment indexes of all the first downlink control information sent by the base station indicate indexes of physical downlink shared channels corresponding to the first downlink control information, and some indicate indexes of physical downlink control channels indicating downlink semi-persistent scheduling release; correspondingly, the total downlink assignment index is a sum of a quantity of physical downlink shared channels corresponding to all the first downlink control information and the quantity of physical downlink control channels indicating downlink semi-persistent scheduling release. Alternatively, the downlink assignment index of each piece of first downlink control information sent by the base station indicates the index of the physical downlink control channel indicating downlink semi-persistent scheduling release; correspondingly, the total downlink assignment index is the quantity of physical downlink control channels indicating downlink semi-persistent scheduling release. In brief, the downlink assignment index (DAI for short) is used to represent an accumulative quantity of PDSCHs allocated in a downlink association subframe set on one or more scheduled carriers and physical downlink control channels (PDCCHs)/enhanced physical downlink control channels (ePDCCHs) indicating downlink SPS release. The total downlink assignment index is used to represent a total quantity of PDCCHs indicating scheduled PDSCHs and/or PDCCHs indicating SPS release.

It should be noted that, a bit quantity of the total downlink assignment index and that of the downlink assignment index may be any one of 2 bits to 8 bits.

The user equipment in this embodiment first receives each piece of first downlink control information sent by the base station, and further generates the hybrid automatic repeat request response message according to the total downlink assignment index, the downlink assignment index of each piece of first downlink control information, and the physical downlink shared channel corresponding to each piece of first downlink control information, where a quantity of response information in the hybrid automatic repeat request response message is the same as the total downlink assignment index. The user equipment sends the hybrid automatic repeat request response message to the base station. Because the user equipment can receive the total downlink assignment index sent by the base station, the user equipment can determine, according to the total downlink assignment index and the downlink assignment index of each piece of first downlink control information, downlink control information missed by the user equipment itself, and further generate the hybrid automatic repeat request response message with reference to the physical downlink shared channel corresponding to each piece of received first downlink control information. The hybrid automatic repeat request response message includes feedback responses of the user equipment to all downlink control information sent by the base station. All the downlink control information sent by the base station includes each piece of first downlink control information received by the user equipment, and further includes the downlink control information missed by the user equipment.

For example, if the downlink assignment indexes of all the first downlink control information received by the user equipment are 1, 3, 4, and 6, respectively, and the total downlink assignment index is 7, the missed downlink control information can be determined according to the total downlink assignment index and the downlink assignment indexes of all the first downlink control information, and downlink assignment indexes of the missed downlink control information are 2, 5, and 7.

Because the quantity of response information in the hybrid automatic repeat request response message sent by the user equipment to the base station is the same as the total downlink assignment index, a problem can be effectively resolved that because of missed detection of the user equipment, the base station cannot correctly decode the hybrid automatic repeat request response message fed back by the user equipment. The response information in the hybrid automatic repeat request response message is an ACK or an NACK, and the quantity of response information is a total quantity of ACKs and/or NACKs. The "ACK and/or NACK" represents an ACK, or an NACK, or an ACK and an NACK.

Further, a specific implementation manner in which the processing module 12 is configured to generate a hybrid automatic repeat request response message according to the total downlink assignment index, the downlink assignment index of each piece of first downlink control information, and a physical downlink shared channel corresponding to each piece of first downlink control information may be that: the user equipment separately generates, according to whether the physical downlink shared channel corresponding to each piece of first downlink control information is correctly decoded, response information for the physical downlink shared channel corresponding to each piece of first downlink control information; obtains a sorting result by sorting the downlink assignment indexes of all the first downlink control information, determines second downlink control information according to the sorting result and the total downlink assignment index, and obtains a downlink assignment index of the second downlink control information, where response information for a physical downlink shared channel corresponding to the second downlink control information is a negative acknowledgment (NACK); and generates the hybrid automatic repeat request response message according to the response information for the physical downlink shared channel corresponding to each piece of first downlink control information and the response information for the physical downlink shared channel corresponding to the second downlink control information, where an arrangement order of the response information for the physical downlink shared channel corresponding to each piece of first downlink control information and the response information for the physical downlink shared channel corresponding to the second downlink control information is the same as an order of the downlink assignment index of each piece of first downlink control information and the downlink assignment index of the second downlink control information, where the response information for the physical downlink shared channel corresponding to each piece of first downlink control information and the response information for the physical downlink shared channel corresponding to the second downlink control information are in the hybrid automatic repeat request response message.

The second downlink control information is the missed downlink control information, and both the second downlink control information and the first downlink control information are downlink control information sent by the base station to the user equipment. A difference lies in that when the base station sends multiple pieces of downlink control information to the user equipment, missed detection of the user equipment occurs. Herein, the downlink control information missed by the user equipment is referred to as the second downlink control information, so as to be differentiated from the first downlink control information.

Specifically, first, the user equipment generates, according to whether the physical downlink shared channel corresponding to each piece of received first downlink control information is correctly decoded, the response information for the physical downlink shared channel corresponding to each piece of first downlink control information, where the response information includes acknowledgment information ACK for correct decoding, and negative acknowledgment information NACK for incorrect decoding. Next, the user equipment obtains the sorting result by sorting the downlink assignment indexes of all the first downlink control information, where the sorting result may be sorting the downlink assignment indexes in ascending order, or may be sorting the downlink assignment indexes in descending order; and can determine, by using the sorting result obtained by sorting the downlink assignment indexes of the received first downlink control information and the total downlink assignment index, the missed second downlink control information and the downlink assignment index of the second downlink control information. Because the second downlink control information is missed by the user equipment, the response information for the physical downlink shared channel corresponding to the second downlink control information is only the negative acknowledgment information NACK. Further, the user equipment generates the hybrid automatic repeat request response message, where the hybrid automatic repeat request response message includes the response information for the physical downlink shared channel corresponding to the first downlink control information and the response information for the physical downlink shared channel corresponding to the second downlink control information. In addition, the arrangement order of the foregoing response information in the hybrid automatic repeat request response message is the same as the arrangement order of the downlink assignment indexes of all the downlink control information, and the downlink control information includes the first downlink control information and the second downlink control information.

For example, if the user equipment receives five pieces of downlink control information (DCI), downlink assignment indexes (DAIs) of all the DCI are 3, 1, 4, 6, and 7, respectively, and the received total downlink assignment index is 9, first, the user equipment generates response information according to whether a PDSCH corresponding to the received DCI is correctly decoded. Assuming that decoding is all correct herein, the response information is all 1. Next, the user equipment sorts the DAIs of the received DCI, and a sorting result is 1, 3, 4, 6, and 7, and a corresponding HARQ-ACK is 11111. In this case, the HARQ-ACK does not include response information for missed information. According to the method in this embodiment of the present disclosure, it can be determined, according to the sorting result and the total downlink assignment index 9, that downlink control information whose downlink assignment indexes are 2, 5, 8, and 9 are missed, and response information for the missed downlink control information is all 0. Then, the user equipment generates, according to the response information for the detected downlink control information and the missed downlink control information, an HARQ-ACK that is finally to be sent to the base station, and the HARQ-ACK is 101101100.

In this embodiment, a receiving module of user equipment receives at least one piece of first downlink control information sent by a base station, where each piece of first downlink control information carries a downlink assignment index, and the at least one piece of first downlink control information further carries a total downlink assignment index; and a processing module of the user equipment can determine, according to the total downlink assignment index and the downlink assignment index of each piece of first downlink control information, downlink control information missed by the user equipment itself, and further generate a hybrid automatic repeat request response message with reference to a physical downlink shared channel corresponding to each piece of received first downlink control information, where the hybrid automatic repeat request response message includes response information of the user equipment for all downlink control information sent by the base station. Therefore, the base station can correctly decode the hybrid automatic repeat request response message. In addition, the user equipment in this embodiment can effectively reduce a useless information feedback by the user equipment, and further improve transmission performance of uplink control information.

In the foregoing user equipment embodiment of the present disclosure, the technical effect of effectively reducing useless information fed back by the user equipment, and improving transmission performance of uplink control information is explained and described as follows: Specifically, because a basis for the foregoing user equipment embodiment of the present disclosure is that the total downlink assignment index scheduled by the base station is sent to the user equipment, and the user equipment only needs to perform a feedback on the information scheduled by the base station, the fed-back useless information can be effectively reduced. Herein, description is made by using an example in which in FDD carrier aggregation, 32 downlink carriers are configured for the user equipment but only six downlink carriers of them are scheduled for the user equipment. If an HARQ-ACK is fed back based on an existing quantity of configured carriers, because the 32 downlink carriers are configured for the user equipment, the user equipment needs to feed back a 32-bit HARQ-ACK. Herein, that one carrier is corresponding to a 1-bit HARQ-ACK is used for exemplary description. By using a method in the foregoing user equipment embodiment of the present disclosure, the user equipment needs to feed back only a 6-bit HARQ-ACK, so that 26-bit overheads can be effectively reduced.

In the first user equipment embodiment of the present disclosure, that the receiving module 11 is configured to receive at least one piece of first downlink control information sent by a base station, where each piece of first downlink control information carries a downlink assignment index, and at least one piece of the first downlink control information further carries a total downlink assignment index may have multiple different specific implementation manners. That is, there are multiple different specific implementation manners for how the user equipment specifically obtains the total downlink assignment index carried in the first downlink control information. The following uses five different implementation manners for specific explanation and description.

In a second user equipment embodiment of the present disclosure, specifically, a schematic structural diagram of the second user equipment embodiment of the present disclosure may use the same structure as that of the foregoing first user equipment embodiment. A difference lies in that the receiving module 11 in the second user equipment embodiment of the present disclosure is specifically configured to: set a first carrier quantity threshold, receive the at least one piece of first downlink control information sent by the base station, and obtain the downlink assignment index of each piece of first downlink control information; and if a carrier number of a carrier corresponding to the first downlink control information is greater than the first carrier quantity threshold, obtain the total downlink assignment index in a transmit power control (TPC) field in the first downlink control information.

That is, the receiving module 11 specifically obtains the total downlink assignment index in a TPC field in first downlink control information when a carrier number of a carrier that carries the first downlink control information is greater than the first carrier quantity threshold.

Optionally, before setting the first carrier quantity threshold, the receiving module 11 is further configured to receive the first carrier quantity threshold sent by the base station. That is, the first carrier quantity threshold may be a value that is set in a standard or system, or may be notified to the user equipment by the base station by using signaling. For TDD carrier aggregation, the first carrier quantity threshold may be 5. For FDD carrier aggregation, the first carrier quantity threshold may be 10, 20, or the like.

Further, after the processing module 12 generates the hybrid automatic repeat request response message, the sending module 13 needs to send the hybrid automatic repeat request response message to the base station, and specifically, there are the following two sending manners.

In a first manner, the receiving module 11 of the user equipment is further configured to receive a quantity of configured carriers that is sent by the base station. Correspondingly, that the sending module 13 is configured to send the hybrid automatic repeat request response message to the base station may be specifically as follows: if the quantity of configured carriers is greater than the first threshold, sending the hybrid automatic repeat request response message to the base station by using a physical uplink control channel format 4; or if the quantity of configured carriers is less than or equal to the first threshold, sending the hybrid automatic repeat request response message to the base station by using a physical uplink control channel format 3.

Specifically, the first threshold may be 5. A maximum HARQ-ACK bit quantity supported by the PUCCH format 3 in an existing standard is 21 bits, or 20 bits, or 22 bits, and correspondingly supports aggregation of five carriers. When the quantity of configured carriers that is configured for the user equipment is greater than 5, the HARQ-ACK is sent by using a new PUCCH format (the PUCCH format 4). When the quantity of the configured carriers that is configured for the user equipment is less than or equal to 5, the HARQ-ACK is sent by using the PUCCH format 3.

In a second manner, the processing module 12 of the user equipment is further configured to obtain a hybrid automatic repeat request response message bit quantity threshold supported on a pre-defined physical uplink control channel. Correspondingly, that the sending module 13 is configured to send the hybrid automatic repeat request response message to the base station includes: if the total downlink assignment index is greater than the hybrid automatic repeat request response message bit quantity threshold supported on the physical uplink control channel, sending the hybrid automatic repeat request response message to the base station by using a physical uplink control channel format 4; or if the total downlink assignment index is less than or equal to the hybrid automatic repeat request response message bit quantity threshold supported on the physical uplink control channel, sending the hybrid automatic repeat request response message to the base station by using a physical uplink control channel format 3.

Specifically, different from the previous manner of sending the hybrid automatic repeat request response message, the user equipment may receive a quantity threshold of configured carriers that is sent by the base station, where the quantity threshold of the configured carriers may be 5, that is, the value may be the same as the foregoing first threshold; and obtain, according to the quantity threshold of the configured carriers, the hybrid automatic repeat request response message bit quantity threshold supported on the physical uplink shared channel. Certainly, in addition, the hybrid automatic repeat request response message bit quantity threshold supported on the physical uplink shared channel may be set in a protocol or standard. The user equipment determines, by using a magnitude relationship between the total downlink assignment index and the hybrid automatic repeat request response message bit quantity threshold supported on the physical uplink shared channel, whether to send the hybrid automatic repeat request response message by using the PUCCH format 4 or the PUCCH format 3. The hybrid automatic repeat request response message bit quantity threshold may be 21 bits, 20 bits, or 22 bits. In addition, it should further be noted that, if only a primary component carrier is scheduled, the hybrid automatic repeat request response message may be sent by using a PUCCH format 1a/1b or a PUCCH format 1a/1b with channel selection. It should be noted that, the user equipment may send the hybrid automatic repeat request response message in the foregoing manner. However, a case exists, that is, the user equipment does not receive the total downlink assignment index; then the user equipment may directly send the hybrid automatic repeat request response message by using the PUCCH format 3.

Optionally, if there are multiple pieces of the first downlink control information corresponding to carriers whose carrier numbers are greater than the first carrier quantity threshold, a specific implementation manner in which the receiving module 11 of the user equipment is configured to obtain the total downlink assignment index in TPC field in the first downlink control information may be as follows: obtaining the total downlink assignment index in TPC fields in some of the first downlink control information, or obtaining a PUCCH format 4 resource indicator in TPC fields in some of the first downlink control information. Further, that the receiving module 11 is configured to: obtain the total downlink assignment index in TPC fields in some of the first downlink control information, or obtain a PUCCH format 4 resource indicator in TPC fields in some of the first downlink control information may further be specifically as follows: obtaining the total downlink assignment index in the TPC field in the first downlink control information if the carrier number of the carrier corresponding to the first downlink control information is greater than the first carrier quantity threshold, and parity of the carrier number of the carrier corresponding to the first downlink control information is the same as that of the first carrier quantity threshold; or obtaining the PUCCH format 4 resource indicator in the TPC field in the first downlink control information if the carrier number of the carrier corresponding to the first downlink control information is greater than the first carrier quantity threshold, and parity of the carrier number of the carrier corresponding to the first downlink control information is different from that of the first carrier quantity threshold. It should be noted that, if there is only one piece of first downlink control information corresponding to a carrier whose carrier number is greater than the first carrier quantity threshold, the total downlink assignment index is obtained in a TPC field in the first downlink control information, and a PUCCH format resource indicator may use a default PUCCH format resource indicator.

In a third user equipment embodiment of the present disclosure, specifically, a schematic structural diagram of the third user equipment embodiment of the present disclosure may use the same structure as that of the foregoing first user equipment embodiment. A difference lies in that the receiving module 11 in the third user equipment embodiment of the present disclosure is specifically configured to: set a second threshold, receive the at least one piece of first downlink control information sent by the base station, and obtain the downlink assignment index of each piece of first downlink control information; and if the downlink assignment index of the downlink control information is greater than the second threshold, obtain the total downlink assignment index in a TPC field in the first downlink control information corresponding to the downlink assignment index.

Optionally, if there are multiple pieces of first downlink control information whose downlink assignment indexes are greater than the second threshold, that the receiving module 11 is configured to obtain the total downlink assignment index in a TPC field in the first downlink control information corresponding to the downlink assignment index may be specifically as follows: obtaining the total downlink assignment index in TPC fields in some of the first downlink control information, or obtaining a PUCCH format 4 resource indicator in TPC fields in some of the first downlink control information. Further, that the receiving module 11 is configured to: obtain the total downlink assignment index in TPC fields in some of the first downlink control information, or obtain a PUCCH format 4 resource indicator in TPC fields in some of the first downlink control information may be specifically as follows: obtaining the total downlink assignment index in the TPC field in the first downlink control information if the downlink assignment index of the first downlink control information is greater than the second threshold, and parity of the downlink assignment index is the same as that of the second threshold; or obtaining the PUCCH format 4 resource indicator in the TPC field in the first downlink control information if the downlink assignment index of the first downlink control information is greater than the second threshold, and parity of the downlink assignment index is different from that of the second threshold.

In a fourth user equipment embodiment of the present disclosure, specifically, a schematic structural diagram of the fourth user equipment embodiment of the present disclosure may use the same structure as that of the foregoing first user equipment embodiment. A difference lies in that the receiving module 11 in the fourth user equipment embodiment of the present disclosure is specifically configured to: receive the at least one piece of first downlink control information sent by the base station, obtain the downlink assignment index of each piece of first downlink control information, and obtain the total downlink assignment index in a total downlink assignment index field in each piece of first downlink control information.

In a fifth user equipment embodiment of the present disclosure, specifically, a schematic structural diagram of the fifth user equipment embodiment of the present disclosure may use the same structure as that of the foregoing first user equipment embodiment. A difference lies in that the receiving module 11 in the fifth user equipment embodiment of the present disclosure is specifically configured to: receive the at least one piece of first downlink control information sent by the base station, obtain the downlink assignment index of each piece of first downlink control information, and obtain the total downlink assignment index in a total downlink assignment index field in first downlink control information carried by a primary component carrier.

In a sixth user equipment embodiment of the present disclosure, specifically, a schematic structural diagram of the sixth user equipment embodiment of the present disclosure may use the same structure as that of the foregoing first user equipment embodiment. A difference lies in that the receiving module 11 in the sixth user equipment embodiment of the present disclosure is specifically configured to: receive the at least one piece of first downlink control information sent by the base station; and if special scrambling processing is performed on a cyclic redundancy check (CRC for short) code of the first downlink control information, perform descrambling processing on the first downlink control information, and obtain the total downlink assignment index and a downlink assignment index of the first downlink control information. It can be understood that, if special scrambling processing is not performed on the CRC of the first downlink control information, only the downlink assignment index of the first downlink control information may be obtained.

It should be noted that, this embodiment of the present disclosure is not limited to a case in which the total downlink assignment index is obtained in first downlink control information that meets the foregoing conditions. On a basis of content disclosed in the present disclosure, persons skilled in the art may obtain the total downlink assignment index in another alternative manner. Further, this embodiment of the present disclosure is not limited to the foregoing case in which the total downlink assignment index is obtained in a TPC field or a newly added total downlink assignment index field either. It can be understood that, the total downlink assignment index may be obtained in another field in existing first downlink control information, or the total downlink assignment index may be obtained in another newly added field.

On a basis of the first user equipment embodiment, in the second to the sixth user equipment embodiments of the present disclosure, the total downlink assignment index is further obtained in the foregoing five different manners. Therefore, in the second to the sixth user equipment embodiments of the present disclosure, the following technical effect further exists while a technical effect that is the same as that in the first user equipment embodiment can be obtained. In all the foregoing five manners, the total downlink assignment index is obtained by using existing signaling. Therefore, no additional signaling overhead is increased.

Figure 2:
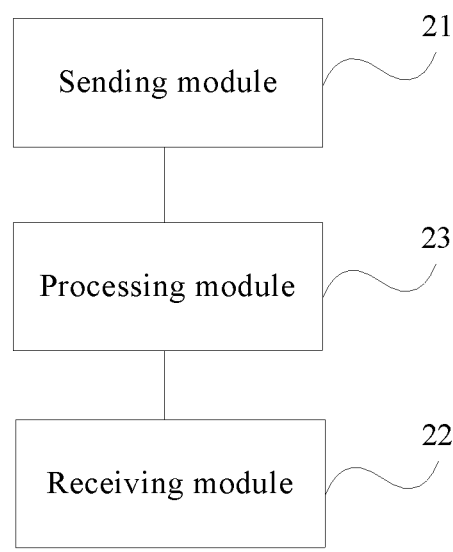
FIG. 2 is a schematic structural diagram of a first base station embodiment according to the present disclosure.

FIG. 2 is a schematic structural diagram of a first base station embodiment according to the present disclosure. As shown in FIG. 2, a base station in this embodiment may include a sending module 21, a receiving module 22, and a processing module 23. The sending module 21 is configured to send at least one piece of downlink control information to user equipment, where each piece of downlink control information carries a downlink assignment index, and at least one piece of the downlink control information further carries a total downlink assignment index. The receiving module 22 is configured to receive a hybrid automatic repeat request response message sent by the user equipment according to the total downlink assignment index, a downlink assignment index of each piece of first downlink control information, and a physical downlink shared channel corresponding to each piece of first downlink control information. The processing module 23 is configured to obtain, according to the hybrid automatic repeat request response message, response information for a physical downlink shared channel corresponding to each piece of downlink control information.

The downlink control information includes the first downlink control information and second downlink control information. The total downlink assignment index is a quantity of physical downlink shared channels corresponding to all the downlink control information, or a quantity of physical downlink control channels indicating downlink semi-persistent scheduling release, or a sum of a quantity of physical downlink shared channels corresponding to all the downlink control information and a quantity of physical downlink control channels indicating downlink semi-persistent scheduling release.

Each downlink assignment index is used to indicate an index of a physical downlink shared channel corresponding to downlink control information carrying the downlink assignment index, or is used to indicate an index of a physical downlink control channel indicating downlink semi-persistent scheduling release, or is used to indicate an index of a physical downlink shared channel corresponding to downlink control information carrying the downlink assignment index and a physical downlink control channel indicating downlink semi-persistent scheduling release.

In this embodiment, a sending module of a base station sends at least one piece of downlink control information to user equipment, where each piece of downlink control information carries a downlink assignment index, and at least one piece of the downlink control information further carries a total downlink assignment index. Next, a receiving module of the base station receives a hybrid automatic repeat request response message sent by a terminal, where the hybrid automatic repeat request response message is a hybrid automatic repeat request response message sent by the user equipment according to the total downlink assignment index, a downlink assignment index of each piece of first downlink control information, and a physical downlink shared channel corresponding to each piece of first downlink control information, and the hybrid automatic repeat request response message includes response information of the user equipment for all the downlink control information sent by the base station. Further, a processing module of the base station can obtain, according to the hybrid automatic repeat request response message, response information for a physical downlink shared channel corresponding to each piece of downlink control information. Therefore, the base station can correctly decode the hybrid automatic repeat request response message. In addition, the base station in this embodiment can further effectively reduce receiving a useless information feedback by the user equipment, so as to improve transmission performance of uplink control information.

In the first base station embodiment of the present disclosure, that the sending module 21 is configured to send at least one piece of downlink control information to user equipment, where each piece of downlink control information carries a downlink assignment index, and at least one piece of the downlink control information further carries a total downlink assignment index may have multiple different specific implementation manners. That is, there are multiple different specific implementation manners for how to notify the total downlink assignment index by using the downlink control information by the base station. The following uses five different implementation manners for specific explanation and description.

In a second base station embodiment of the present disclosure, specifically, a schematic structural diagram of the second base station embodiment of the present disclosure may use the same structure as that of the foregoing first base station embodiment. A difference lies in that, in the second base station embodiment of the present disclosure, that the sending module 22 is configured to send at least one piece of downlink control information to user equipment, where each piece of downlink control information carries a downlink assignment index, and at least one piece of the downlink control information further carries a total downlink assignment index may be specifically as follows: separately setting the downlink assignment index of each piece of downlink control information in each piece of downlink control information; if a carrier number of a carrier corresponding to the downlink control information is greater than a first carrier quantity threshold, setting the total downlink assignment index in a TPC field in the downlink control information; and sending at least one piece of the downlink control information to the user equipment.

Optionally, the sending module is further configured to send the first carrier quantity threshold to the user equipment. Certainly, it can be understood that the first carrier quantity threshold may be defined in a protocol or system in advance, which is not construed as a limitation herein.

Further, if there are multiple pieces of the downlink control information corresponding to carriers whose carrier numbers are greater than the first carrier quantity threshold, that the sending module 22 is configured to set the total downlink assignment index in a TPC field in the downlink control information may be specifically as follows: setting the total downlink assignment index in TPC fields in some of the downlink control information, or setting a physical uplink control channel (PUCCH) format 4 resource indicator in TPC fields in some of the downlink control information. Further, that the sending module 22 is configured to: set the total downlink assignment index in TPC fields in some of the downlink control information, or set a PUCCH format 4 resource indicator in TPC fields in some of the downlink control information may be further specifically as follows: setting the total downlink assignment index in the TPC field in the downlink control information if the carrier number of the carrier corresponding to the downlink control information is greater than the first carrier quantity threshold, and parity of the carrier number of the carrier corresponding to the downlink control information is the same as that of the first carrier quantity threshold; or setting the PUCCH format 4 resource indicator in the TPC field in the downlink control information if the carrier number of the carrier corresponding to the downlink control information is greater than the first carrier quantity threshold, and parity of the carrier number of the carrier corresponding to the downlink control information is different from that of the first carrier quantity threshold.

In a third base station embodiment of the present disclosure, specifically, a schematic structural diagram of the third base station embodiment of the present disclosure may use the same structure as that of the foregoing first base station embodiment. A difference lies in that, in the third base station embodiment of the present disclosure, that the sending module 22 is configured to send at least one piece of downlink control information to user equipment, where each piece of downlink control information carries a downlink assignment index, and at least one piece of the downlink control information further carries a total downlink assignment index may be specifically as follows: separately setting the downlink assignment index of each piece of downlink control information in each piece of downlink control information; if a downlink assignment index of downlink control information is greater than a second threshold, setting the total downlink assignment index in a TPC field in the downlink control information; and sending at least one piece of the downlink control information to the user equipment. That is, it is determined, based on a downlink assignment index of downlink control information, whether a TPC field in the downlink control information is used as the total downlink assignment index.

Further, if there are multiple pieces of downlink control information whose downlink assignment indexes are greater than the second threshold, that the sending module is configured to set the total downlink assignment index in a TPC field in the downlink control information may be specifically as follows: setting the total downlink assignment index in TPC fields in some of the downlink control information, or setting a PUCCH format 4 resource indicator in TPC fields in some of the downlink control information. Further, that the sending module is configured to: set the total downlink assignment index in TPC fields in some of the downlink control information, or set a PUCCH format 4 resource indicator in TPC fields in some of the downlink control information may be further specifically as follows: setting the total downlink assignment index in the TPC field in the downlink control information if the downlink assignment index of the downlink control information is greater than the second threshold, and parity of the downlink assignment index is the same as that of the second threshold; or setting the PUCCH format 4 resource indicator in the TPC field in the downlink control information if the downlink assignment index of the downlink control information is greater than the second threshold, and parity of the downlink assignment index is different from that of the second threshold.

In a fourth base station embodiment of the present disclosure, specifically, a schematic structural diagram of the fourth base station embodiment of the present disclosure may use the same structure as that of the foregoing first base station embodiment. A difference lies in that, in the fourth base station embodiment of the present disclosure, that the sending module 22 is configured to send at least one piece of downlink control information to user equipment, where each piece of downlink control information carries a downlink assignment index, and at least one piece of the downlink control information further carries a total downlink assignment index may be specifically as follows: separately setting the downlink assignment index of each piece of downlink control information in each piece of downlink control information, setting the total downlink assignment index in a total downlink assignment index field in each piece of downlink control information, and sending at least one piece of the downlink control information to the user equipment.

That is, total downlink assignment index fields such as 2 bits or 3 bits are newly added in all the downlink control information, and are specially used to indicate the total downlink assignment index.

In a fifth base station embodiment of the present disclosure, specifically, a schematic structural diagram of the fifth base station embodiment of the present disclosure may use the same structure as that of the foregoing first base station embodiment. A difference lies in that, in the fifth base station embodiment of the present disclosure, that the sending module 22 is configured to send at least one piece of downlink control information to user equipment, where each piece of downlink control information carries a downlink assignment index, and at least one piece of the downlink control information further carries a total downlink assignment index may be specifically as follows: separately setting the downlink assignment index of each piece of downlink control information in each piece of downlink control information, setting the total downlink assignment index in a total downlink assignment index field in downlink control information carried by a primary component carrier, and sending at least one piece of the downlink control information to the user equipment.

That is, the total downlink assignment index field is newly added only in the downlink control information on the primary component carrier, and is used to indicate the total downlink assignment index. The total downlink assignment index field is not added in downlink control information on another secondary component carrier.

In a sixth base station embodiment of the present disclosure, specifically, a schematic structural diagram of the sixth base station embodiment of the present disclosure may use the same structure as that of the foregoing first base station embodiment. A difference lies in that, in the sixth base station embodiment of the present disclosure, that the sending module 22 is configured to send at least one piece of downlink control information to user equipment, where each piece of downlink control information carries a downlink assignment index, and at least one piece of the downlink control information further carries a total downlink assignment index may be specifically as follows: setting the total downlink assignment index in the at least one piece of downlink control information, and performing special scrambling processing on a CRC of downlink control information carrying the total downlink assignment index, so as to obtain the scrambled downlink control information; and sending, to the user equipment, the scrambled downlink control information and downlink control information on which scrambling processing is not performed, where both the scrambled downlink control information and the downlink control information on which scrambling processing is not performed carry a downlink assignment index.

That is, scrambling processing is performed on the CRC of the downlink control information carrying the total downlink assignment index, and scrambling processing is not performed on a CRC of downlink control information that does not carry the total downlink assignment index.

Further, in any one of the foregoing first base station embodiment to the sixth base station embodiment, for a case in which the total downlink assignment index is set in the downlink control information, a quantity of bits occupied by the total downlink assignment index may be 2 bits, 3 bits, 5 bits, or the like. If the quantity of bits occupied by the total downlink assignment index is less than 5 bits, a status quantity corresponding to the quantity of bits occupied by the total downlink assignment index is obtained; a status corresponding to the total downlink assignment index is obtained by obtaining a remainder of the total downlink assignment index divided by the status quantity; and the total downlink assignment index is represented by using the status corresponding to the total downlink assignment index.

Specifically, if the quantity of bits occupied by the total downlink assignment index is less than 5 bits, a case in which the status quantity corresponding to the quantity of bits occupied by the total downlink assignment index is different from the total downlink assignment index occurs. For example, if the total downlink assignment index is less than or equal to 32, and the quantity of bits occupied by the total downlink assignment index is 2 bits, the status corresponding to the total downlink assignment index needs to be obtained in the foregoing manner of obtaining a reminder, that is, the total downlink assignment index is represented by using the status. Specifically, when the quantity of bits occupied by the total downlink assignment index is 2 bits, a correspondence between the status corresponding to the total downlink assignment index and the total downlink assignment index may be shown in Table 3; when the quantity of bits occupied by the total downlink assignment index is 3 bits, a correspondence between the status corresponding to the total downlink assignment index and the total downlink assignment index may be shown in Table 4; when the quantity of bits occupied by the total downlink assignment index is 5 bits, a correspondence between the status corresponding to the total downlink assignment index and the total downlink assignment index may be shown in Table 5.

TABLE 3

Correspondence between a status corresponding to a 2-bit total downlink assignment index and the total downlink assignment index

| Status | Total downlink assignment index |
|---|---|
| 00 | 0, or 4, or 8, or 12, or 16, or 20, or 24, or 28, or 32 |
| 01 | 1, or 5, or 9, or 13, or 17, or 21, or 25, or 29 |
| 10 | 2, or 6, or 10, or 14, or 18, or 22, or 26, or 30 |
| 11 | 3, or 7, or 11, or 15, or 19, or 23, or 27, or 31 |

TABLE 4

Correspondence between a status corresponding to a 3-bit total downlink assignment index and the total downlink assignment index

| Status | Total downlink assignment index |
|---|---|
| 000 | 0, or 8, or 16, or 24, or 32 |
| 001 | 1, or 9, or 17, or 25 |
| 010 | 2, or 10, or 18, or 26 |
| 011 | 3, or 11, or 19, or 27 |
| 100 | 4, or 12, or 20, or 28 |
| 101 | 5, or 13, or 21, or 29 |
| 110 | 6, or 14, or 22, or 30 |
| 111 | 7, or 15, or 23, or 31 |

TABLE 5

Correspondence between a status corresponding to a 5-bit total downlink assignment index and the total downlink assignment index

| Status | Total downlink assignment index |
|---|---|
| 00000 | 1 |
| 00001 | 2 |
| 00010 | 3 |
| 00011 | 4 |
| 00100 | 5 |
| 00101 | 6 |
| 00110 | 7 |
| 00111 | 8 |
| 01000 | 9 |
| 01001 | 10 |
| 01010 | 11 |
| 01011 | 12 |
| 01100 | 13 |
| 01101 | 14 |
| 01110 | 15 |

TABLE 5-continued

Correspondence between a status corresponding to a 5-bit total
downlink assignment index and the total downlink assignment index

| Status | Total downlink assignment index |
|---|---|
| 01111 | 16 |
| 10000 | 17 |
| 10001 | 18 |
| 10010 | 19 |
| 10011 | 20 |
| 10100 | 21 |
| 10101 | 22 |
| 10110 | 23 |
| 10111 | 24 |
| 11000 | 25 |
| 11001 | 26 |
| 11010 | 27 |
| 11011 | 28 |
| 11100 | 29 |
| 11101 | 30 |
| 11110 | 31 |
| 11111 | 32 |

On a basis of the first base station embodiment, in the second to the sixth base station embodiments of the present disclosure, the total downlink assignment index is further sent in the foregoing five different manners. Therefore, in the second to the sixth base station embodiments of the present disclosure, the following technical effect further exists while a technical effect that is the same as that in the first base station embodiment can be obtained. In all the foregoing five manners, the total downlink assignment index is obtained by using existing signaling. Therefore, no additional signaling overhead is increased.

Figure 3:
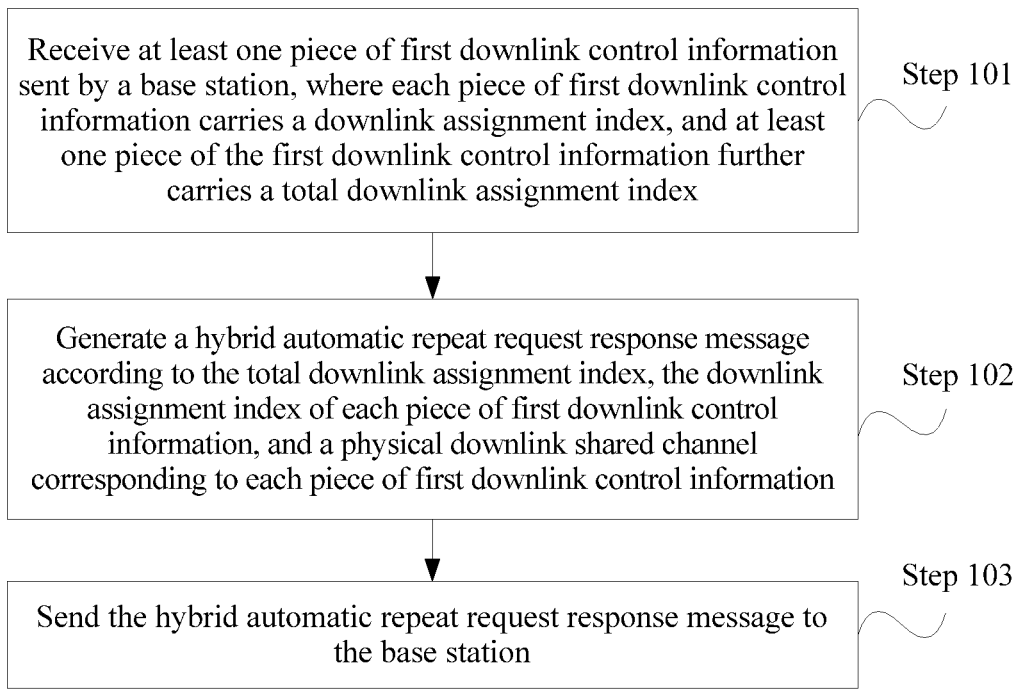
FIG. 3 is a flowchart of a first embodiment of a method for sending control information according to the present disclosure.

FIG. 3 is a flowchart of a first embodiment of a method for sending control information according to the present disclosure. As shown in FIG. 3, this embodiment is executed by user equipment, and the method in this embodiment may include the following steps.

Step 101: Receive at least one piece of first downlink control information sent by a base station, where each piece of first downlink control information carries a downlink assignment index, and at least one piece of the first downlink control information further carries a total downlink assignment index.

Each downlink assignment index is used to indicate an index of a physical downlink shared channel corresponding to first downlink control information carrying the downlink assignment index, or is used to indicate an index of a physical downlink control channel indicating downlink semi-persistent scheduling release; and the total downlink assignment index is a quantity of physical downlink shared channels corresponding to all the first downlink control information, or a quantity of physical downlink control channels indicating downlink semi-persistent scheduling release, or a sum of a quantity of physical downlink shared channels corresponding to all the first downlink control information and a quantity of physical downlink control channels indicating downlink semi-persistent scheduling release.

Specifically, the downlink assignment index of each piece of first downlink control information sent by the base station indicates the index of the physical downlink shared channel corresponding to the first downlink control information; correspondingly, the total downlink assignment index is the quantity of physical downlink shared channels corresponding to all the first downlink control information. Alternatively, some of downlink assignment indexes of all the first downlink control information sent by the base station indicate indexes of physical downlink shared channels corresponding to the first downlink control information, and some indicate indexes of physical downlink control channels indicating downlink semi-persistent scheduling release; correspondingly, the total downlink assignment index is the sum of the quantity of physical downlink shared channels corresponding to all the first downlink control information and the quantity of physical downlink control channels indicating downlink semi-persistent scheduling release. Alternatively, the downlink assignment index of each piece of first downlink control information sent by the base station indicates the index of the physical downlink control channel indicating downlink semi-persistent scheduling release; correspondingly, the total downlink assignment index is the quantity of physical downlink control channels indicating downlink semi-persistent scheduling release. In brief, the downlink assignment index (DAI for short) is used to represent an accumulative quantity of PDCCHs/ePDCCHs corresponding to PDSCHs allocated in a downlink association subframe set on one or more scheduled carriers and PDCCHs/ePDCCHs indicating downlink SPS release. The total downlink assignment index is used to represent a total quantity of PDCCHs indicating scheduled PDSCHs and/or PDCCHs indicating SPS release.

It should be noted that, a bit quantity of the total downlink assignment index and that of the downlink assignment index may be any one of 2 bits to 8 bits.

Step 102: Generate a hybrid automatic repeat request response message according to the total downlink assignment index, the downlink assignment index of each piece of first downlink control information, and a physical downlink shared channel corresponding to each piece of first downlink control information.

For example, if the downlink assignment indexes of all the first downlink control information received by the user equipment are 1, 3, 4, and 6, respectively, and the total downlink assignment index is 7, missed second downlink control information can be determined according to the total downlink assignment index and the downlink assignment indexes of all the first downlink control information, and downlink assignment indexes of the second downlink control information are 2, 5, and 7.

Step 103: Send the hybrid automatic repeat request response message to the base station.

The method for sending control information provided in this embodiment is used to complete processing of the user equipment shown in FIG. 1. Implementation principles and technical effects of the method are similar, and details are not described herein.

There may be multiple different specific implementation manners for step 101 in the first embodiment of the method for sending control information in the present disclosure. That is, there are multiple different specific implementation manners for how the user equipment specifically obtains the total downlink assignment index carried in the first downlink control information. The following uses five different implementation manners for specific explanation and description.

Figure 4:
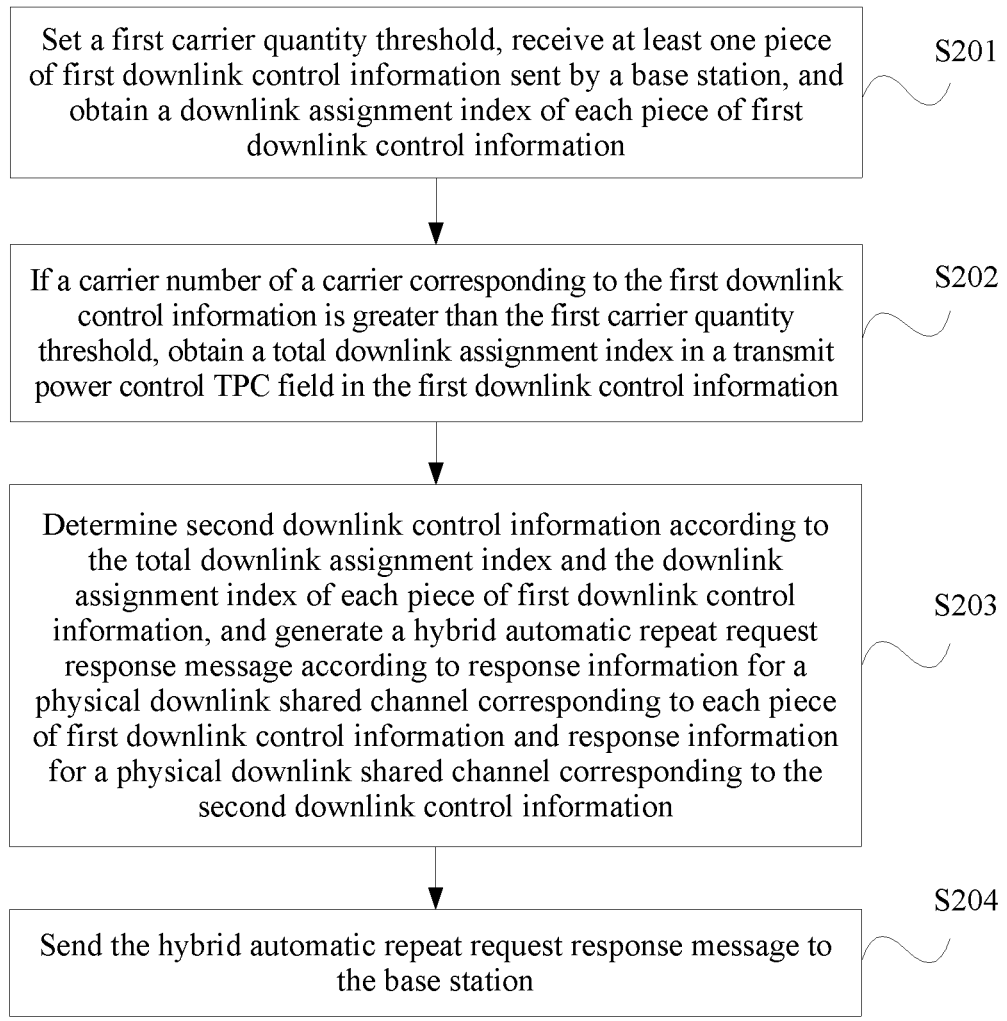
FIG. 4 is a flowchart of a second embodiment of a method for sending control information according to the present disclosure.

FIG. 4 is a flowchart of a second embodiment of a method for sending control information according to the present disclosure. As shown in FIG. 4, the method in this embodiment may include the following steps.

S201. Set a first carrier quantity threshold, receive at least one piece of first downlink control information sent by a base station, and obtain a downlink assignment index of each piece of first downlink control information.

Optionally, before S201, the first carrier quantity threshold sent by the base station may be further received. That is, the first carrier quantity threshold may be a value that is set in a standard or system, or may be notified to user equipment by the base station by using signaling. For TDD carrier aggregation, the first carrier quantity threshold may be 5. For FDD carrier aggregation, the first carrier quantity threshold may be 10, 20, or the like.

S202. If a carrier number of a carrier corresponding to the first downlink control information is greater than the first carrier quantity threshold, obtain a total downlink assignment index in a TPC field in the first downlink control information.

S203. Determine second downlink control information according to the total downlink assignment index and the downlink assignment index of each piece of first downlink control information, and generate a hybrid automatic repeat request response message according to response information for a physical downlink shared channel corresponding to each piece of first downlink control information and response information for a physical downlink shared channel corresponding to the second downlink control information.

S204. Send the hybrid automatic repeat request response message to the base station.

Optionally, the user equipment may further receive a quantity of configured carriers that is sent by the base station. Correspondingly, S204 may be specifically as follows: if the quantity of configured carriers is greater than the first threshold, sending the hybrid automatic repeat request response message to the base station by using a physical uplink control channel format 4; or if the quantity of configured carriers is less than or equal to the first threshold, sending the hybrid automatic repeat request response message to the base station by using a physical uplink control channel format 3.

Specifically, the first threshold may be 5. A maximum HARQ-ACK bit quantity supported by the PUCCH format 3 in an existing standard is 21 bits, or 20 bits, or 22 bits, and correspondingly supports aggregation of five carriers. When the quantity of configured carriers that is configured for the user equipment is greater than 5, an HARQ-ACK is sent by using a new PUCCH format (the PUCCH format 4). When the quantity of the configured carriers that is configured for the user equipment is less than or equal to 5, an HARQ-ACK is sent by using the PUCCH format 3.

In another implementable manner, the user equipment may further receive a quantity threshold of the configured carriers that is sent by the base station, and obtain, according to the quantity threshold of the configured carriers, a hybrid automatic repeat request response message bit quantity threshold supported on a physical uplink control channel. It should be noted that the hybrid automatic repeat request response message bit quantity threshold supported on the physical uplink control channel may be set in a protocol. Correspondingly, S204 may be specifically as follows: if the total downlink assignment index is greater than the hybrid automatic repeat request response message bit quantity threshold supported on the physical uplink control channel, sending the hybrid automatic repeat request response message to the base station by using a physical uplink control channel format 4; or if the total downlink assignment index is less than or equal to the hybrid automatic repeat request response message bit quantity threshold supported on the physical uplink control channel, sending the hybrid automatic repeat request response message to the base station by using a physical uplink control channel format 3.

Specifically, different from the previous manner of sending the hybrid automatic repeat request response message, the user equipment may receive the quantity threshold of the configured carriers that is sent by the base station, where the quantity threshold of the configured carriers may be 5, that is, the value may be the same as the foregoing first threshold; obtain the supported hybrid automatic repeat request response message bit quantity threshold according to the quantity threshold of the configured carriers; and determine, by using a magnitude relationship between the total downlink assignment index and the hybrid automatic repeat request response message bit quantity threshold, whether to send the hybrid automatic repeat request response message by using the PUCCH format 4 or the PUCCH format 3. The hybrid automatic repeat request response message bit quantity threshold may be 21 bits, 20 bits, or 22 bits. In addition, it should further be noted that, if only a primary component carrier is scheduled, the hybrid automatic repeat request response message may be sent by using a PUCCH format 1a/1b or a PUCCH format 1a/1b with channel selection. It should be noted that, the user equipment may send the hybrid automatic repeat request response message in the foregoing manner. However, a case exists, that is, the user equipment does not receive the total downlink assignment index; then the user equipment may directly send the hybrid automatic repeat request response message by using the PUCCH format 3.

Optionally, S202 may also be specifically as follows: if there are multiple pieces of the first downlink control information corresponding to carriers whose carrier numbers are greater than the first carrier quantity threshold, the obtaining a total downlink assignment index in a TPC field in the first downlink control information in S202 may be specifically as follows: obtaining the total downlink assignment index in TPC fields in some of the first downlink control information, or obtaining a PUCCH format 4 resource indicator in TPC fields in some of the first downlink control information. Further, the obtaining the total downlink assignment index in TPC fields in some of the first downlink control information, or obtaining a PUCCH format 4 resource indicator in TPC fields in some of the first downlink control information may further be specifically as follows: obtaining the total downlink assignment index in the TPC field in the first downlink control information if the carrier number of the carrier corresponding to the first downlink control information is greater than the first carrier quantity threshold, and parity of the carrier number of the carrier corresponding to the first downlink control information is the same as that of the first carrier quantity threshold; or obtaining the PUCCH format 4 resource indicator in the TPC field in the first downlink control information if the carrier number of the carrier corresponding to the first downlink control information is greater than the first carrier quantity threshold, and parity of the carrier number of the carrier corresponding to the first downlink control information is different from that of the first carrier quantity threshold. It should be noted that, if there is only one piece of first downlink control information corresponding to a carrier whose carrier number is greater than the first carrier quantity threshold, the total downlink assignment index is obtained in a TPC field in the first downlink control information, and a PUCCH format resource indicator may use a default PUCCH format resource indicator.

The method for sending control information provided in this embodiment is used to complete processing in the second user equipment embodiment. Implementation principles and technical effects of the method are similar, and details are not described herein.

Figure 5:
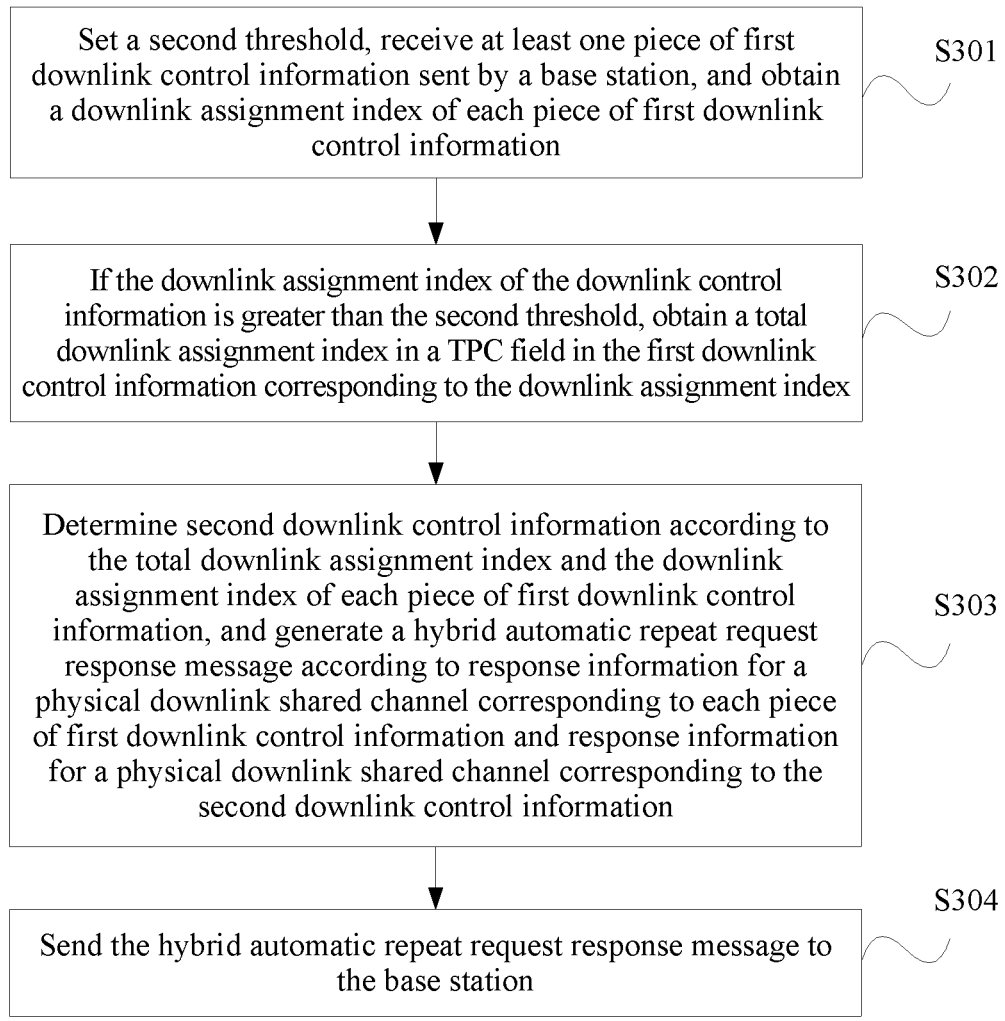
FIG. 5 is a flowchart of a third embodiment of a method for sending control information according to the present disclosure.

FIG. 5 is a flowchart of a third embodiment of a method for sending control information according to the present disclosure. As shown in FIG. 5, the method in this embodiment may include the following steps.

S301. Set a second threshold, receive at least one piece of first downlink control information sent by a base station, and obtain a downlink assignment index of each piece of first downlink control information.

S302. If the downlink assignment index of the downlink control information is greater than the second threshold, obtain a total downlink assignment index in a TPC field in the first downlink control information corresponding to the downlink assignment index.

S303. Determine second downlink control information according to the total downlink assignment index and the downlink assignment index of each piece of first downlink control information, and generate a hybrid automatic repeat request response message according to response information for a physical downlink shared channel corresponding to each piece of first downlink control information and response information for a physical downlink shared channel corresponding to the second downlink control information.

S304. Send the hybrid automatic repeat request response message to the base station.

If there are multiple pieces of first downlink control information whose downlink assignment indexes are greater than the second threshold, the obtaining a total downlink assignment index in a TPC field in the first downlink control information corresponding to the downlink assignment index in S302 may be specifically as follows: obtaining the total downlink assignment index in TPC fields in some of the first downlink control information, or obtaining a PUCCH format 4 resource indicator in TPC fields in some of the first downlink control information. Further, the obtaining the total downlink assignment index in TPC fields in some of the first downlink control information, or obtaining a PUCCH format 4 resource indicator in TPC fields in some of the first downlink control information may be specifically as follows: obtaining the total downlink assignment index in the TPC field in the first downlink control information if the downlink assignment index of the first downlink control information is greater than the second threshold, and parity of the downlink assignment index is the same as that of the second threshold; or obtaining the PUCCH format 4 resource indicator in the TPC field in the first downlink control information if the downlink assignment index of the first downlink control information is greater than the second threshold, and parity of the downlink assignment index is different from that of the second threshold.

The method for sending control information provided in this embodiment is used to complete processing in the third user equipment embodiment. Implementation principles and technical effects of the method are similar, and details are not described herein.

Figure 6:
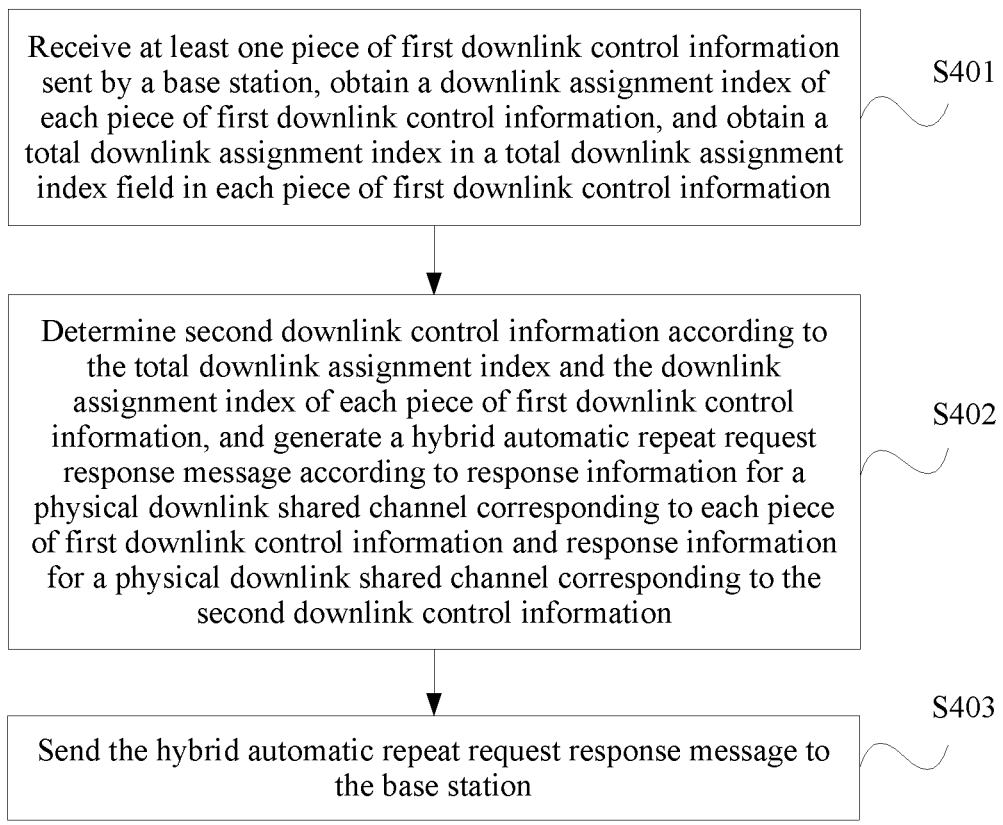
FIG. 6 is a flowchart of a fourth embodiment of a method for sending control information according to the present disclosure.

FIG. 6 is a flowchart of a fourth embodiment of a method for sending control information according to the present disclosure. As shown in FIG. 6, the method in this embodiment may include the following steps.

S401. Receive at least one piece of first downlink control information sent by a base station, obtain a downlink assignment index of each piece of first downlink control information, and obtain a total downlink assignment index in a total downlink assignment index field in each piece of first downlink control information.

S402. Determine second downlink control information according to the total downlink assignment index and the downlink assignment index of each piece of first downlink control information, and generate a hybrid automatic repeat request response message according to response information for a physical downlink shared channel corresponding to each piece of first downlink control information and response information for a physical downlink shared channel corresponding to the second downlink control information.

S403. Send the hybrid automatic repeat request response message to the base station.

The method for sending control information provided in this embodiment is used to complete processing in the fourth user equipment embodiment. Implementation principles and technical effects of the method are similar, and details are not described herein.

Figure 7:
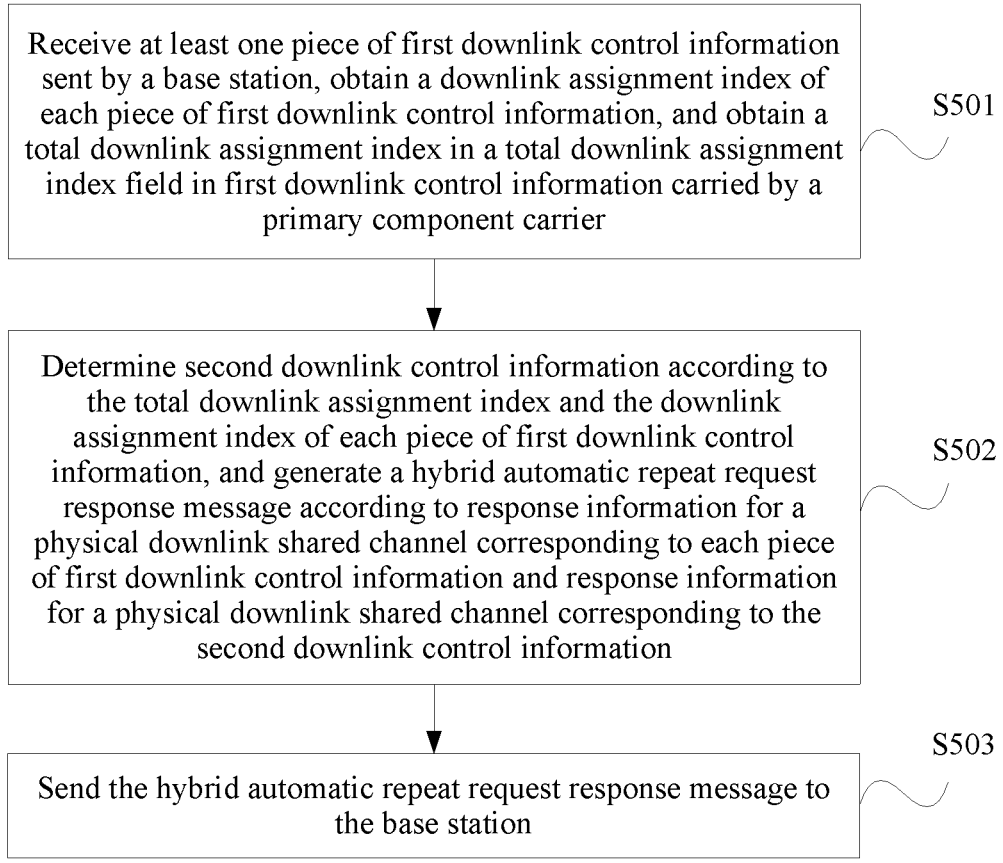
FIG. 7 is a flowchart of a fifth embodiment of a method for sending control information according to the present disclosure.

FIG. 7 is a flowchart of a fifth embodiment of a method for sending control information according to the present disclosure. As shown in FIG. 7, the method in this embodiment may include the following steps.

S501. Receive at least one piece of first downlink control information sent by the base station, obtain a downlink assignment index of each piece of first downlink control information, and obtain a total downlink assignment index in a total downlink assignment index field in first downlink control information carried by a primary component carrier.

S502. Determine second downlink control information according to the total downlink assignment index and the downlink assignment index of each piece of first downlink control information, and generate a hybrid automatic repeat request response message according to response information for a physical downlink shared channel corresponding to each piece of first downlink control information and response information for a physical downlink shared channel corresponding to the second downlink control information.

S503. Send the hybrid automatic repeat request response message to the base station.

The method for sending control information provided in this embodiment is used to complete processing in the fifth user equipment embodiment. Implementation principles and technical effects of the method are similar, and details are not described herein.

Figure 8:
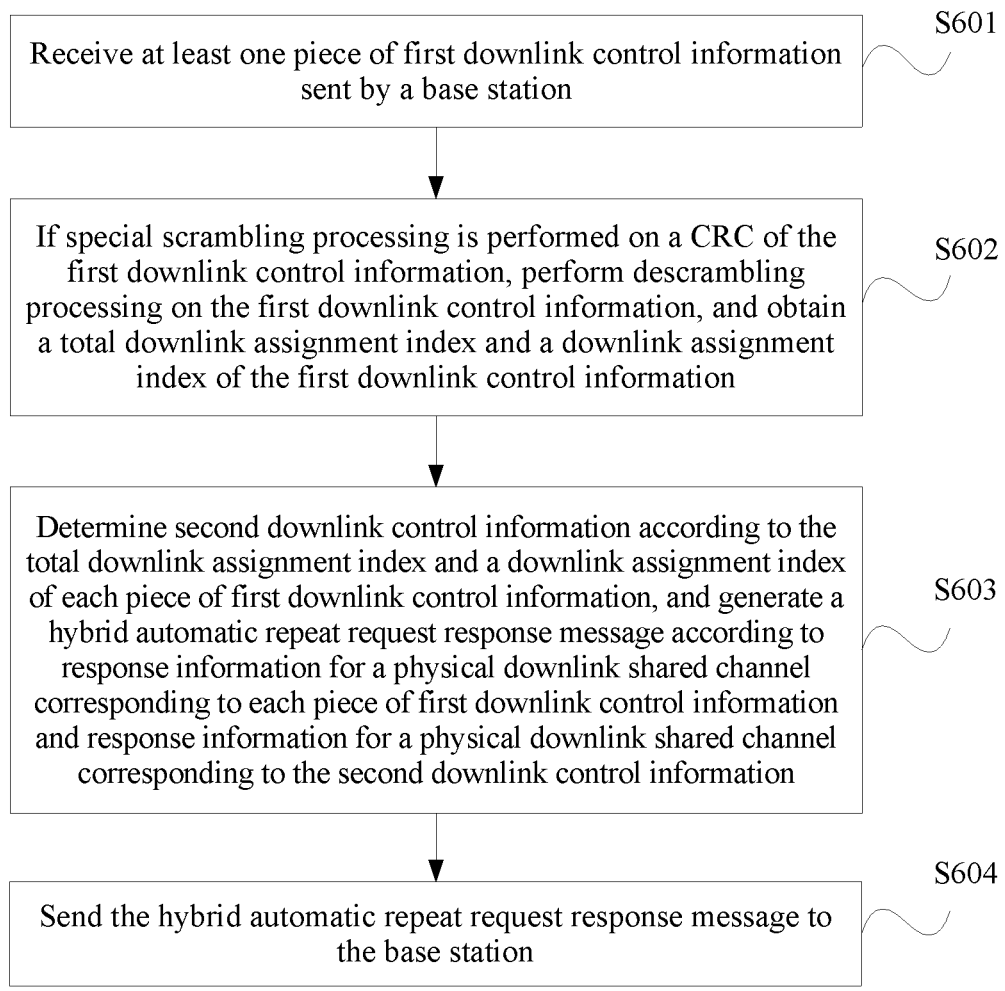
FIG. 8 is a flowchart of a sixth embodiment of a method for sending control information according to the present disclosure.

FIG. 8 is a flowchart of a sixth embodiment of a method for sending control information according to the present disclosure. As shown in FIG. 8, the method in this embodiment may include the following steps.

S601. Receive at least one piece of first downlink control information sent by a base station.

S602. If special scrambling processing is performed on a CRC of the first downlink control information, perform descrambling processing on the first downlink control information, and obtain a total downlink assignment index and a downlink assignment index of the first downlink control information.

Specifically, if special scrambling processing is performed on the CRC of the first downlink control information, the total downlink assignment index and the downlink assignment index of the first downlink control information are obtained from the first downlink control information by performing descrambling processing. If special scrambling processing is not performed on the CRC of the first downlink control information, only the downlink assignment index of the first downlink control information is directly obtained.

S603. Determine second downlink control information according to the total downlink assignment index and a downlink assignment index of each piece of first downlink control information, and generate a hybrid automatic repeat request response message according to response information for a physical downlink shared channel corresponding to each piece of first downlink control information and response information for a physical downlink shared channel corresponding to the second downlink control information.

S604. Send the hybrid automatic repeat request response message to the base station.

The method for sending control information provided in this embodiment is used to complete processing in the sixth user equipment embodiment. Implementation principles and technical effects of the method are similar, and details are not described herein.

On a basis of the first embodiment, in the second embodiment to the sixth embodiment of the present disclosure, the total downlink assignment index is further obtained in the foregoing five different manners. Therefore, in the second embodiment to the sixth embodiment of the present disclosure, the following technical effect further exists while a technical effect that is the same as that in the first embodiment can be obtained. In all the foregoing five manners, the total downlink assignment index is obtained by using existing signaling. Therefore, no additional signaling overhead is increased.

Figure 9:
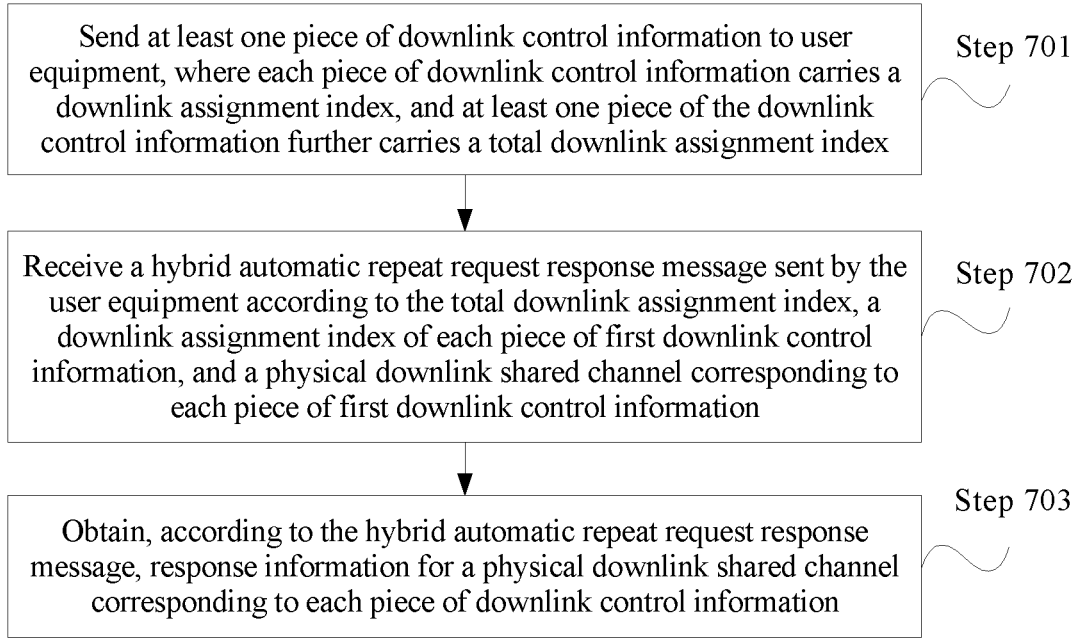
FIG. 9 is a flowchart of a seventh embodiment of a method for sending control information according to the present disclosure.

FIG. 9 is a flowchart of a seventh embodiment of a method for sending control information according to the present disclosure. As shown in FIG. 9, this embodiment is executed by a base station, and the method in this embodiment may include the following steps.

Step 701: Send at least one piece of downlink control information to user equipment, where each piece of downlink control information carries a downlink assignment index, and at least one piece of the downlink control information further carries a total downlink assignment index.

Each downlink assignment index is used to indicate an index of a physical downlink shared channel corresponding to first downlink control information carrying the downlink assignment index, or is used to indicate an index of a physical downlink control channel indicating downlink semi-persistent scheduling release; and the total downlink assignment index is a quantity of physical downlink shared channels corresponding to all first downlink control information, or a quantity of physical downlink control channels indicating downlink semi-persistent scheduling release, or a sum of a quantity of physical downlink shared channels corresponding to all the first downlink control information and a quantity of physical downlink control channels indicating downlink semi-persistent scheduling release.

Specifically, the downlink assignment index of each piece of first downlink control information sent by the base station indicates the index of the physical downlink shared channel corresponding to the first downlink control information; correspondingly, the total downlink assignment index is the quantity of physical downlink shared channels corresponding to all the first downlink control information. Alternatively, some of downlink assignment indexes of all the first downlink control information sent by the base station indicate indexes of physical downlink shared channels corresponding to the first downlink control information, and some indicate indexes of physical downlink control channels indicating downlink semi-persistent scheduling release; correspondingly, the total downlink assignment index is the sum of the quantity of physical downlink shared channels corresponding to all the first downlink control information and the quantity of physical downlink control channels indicating downlink semi-persistent scheduling release.

Alternatively, the downlink assignment index of each piece of first downlink control information sent by the base station indicates the index of the physical downlink control channel indicating downlink semi-persistent scheduling release; correspondingly, the total downlink assignment index is the quantity of physical downlink control channels indicating downlink semi-persistent scheduling release. In brief, the downlink assignment index (DAI for short) is used to represent an accumulative quantity of PDCCHs/ePDCCHs corresponding to PDSCHs allocated in a downlink association subframe set on one or more scheduled carriers and PDCCHs/ePDCCHs indicating downlink SPS release. The total downlink assignment index is used to represent a total quantity of PDCCHs indicating scheduled PDSCHs and/or PDCCHs indicating SPS release.

It should be noted that, a bit quantity of the total downlink assignment index and that of the downlink assignment index may be any one of 2 bits to 8 bits.

Step 702: Receive a hybrid automatic repeat request response message sent by the user equipment according to the total downlink assignment index, a downlink assignment index of each piece of first downlink control information, and a physical downlink shared channel corresponding to each piece of first downlink control information.

Step 703: Obtain, according to the hybrid automatic repeat request response message, response information for a physical downlink shared channel corresponding to each piece of downlink control information.

The method for sending control information provided in this embodiment is used to complete processing of the user equipment shown in FIG. 2. Implementation principles and technical effects of the method are similar, and details are not described herein.

There may be multiple different specific implementation manners for step 701 in the seventh embodiment of the method for sending control information in the present disclosure. That is, there are multiple different specific implementation manners for how to send the total downlink assignment index by the base station. The following uses five different implementation manners for specific explanation and description.

Figure 10:
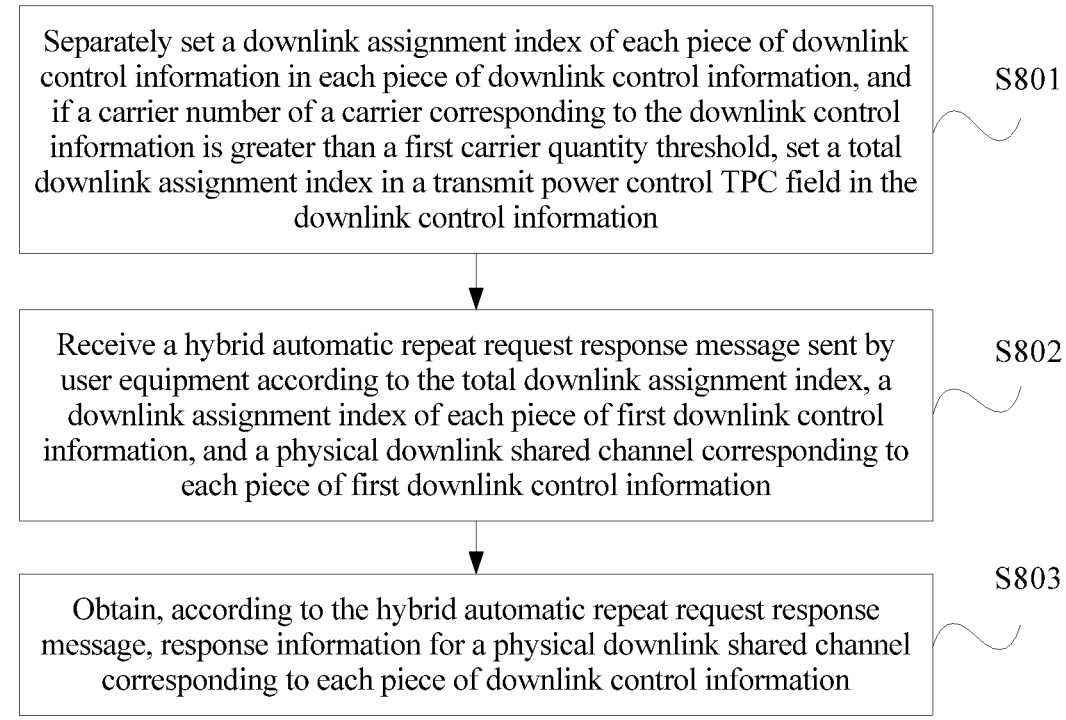
FIG. 10 is a flowchart of an eighth embodiment of a method for sending control information according to the present disclosure.

FIG. 10 is a flowchart of an eighth embodiment of a method for sending control information according to the present disclosure. As shown in FIG. 10, the method in this embodiment may include the following steps.

S801. Separately set a downlink assignment index of each piece of downlink control information in each piece of downlink control information, and if a carrier number of a carrier corresponding to the downlink control information is greater than a first carrier quantity threshold, set a total downlink assignment index in a TPC field in the downlink control information.

S802. Receive a hybrid automatic repeat request response message sent by the user equipment according to the total downlink assignment index, a downlink assignment index of each piece of first downlink control information, and a physical downlink shared channel corresponding to each piece of first downlink control information.

S803. Obtain, according to the hybrid automatic repeat request response message, response information for a physical downlink shared channel corresponding to each piece of downlink control information.

Optionally, if there are multiple pieces of the downlink control information corresponding to carriers whose carrier numbers are greater than the first carrier quantity threshold, the setting a total downlink assignment index in a TPC field in the downlink control information in S801 may be specifically as follows: setting the total downlink assignment index in TPC fields in some of the downlink control information, or setting a PUCCH format 4 resource indicator in TPC fields in some of the downlink control information.

Further, the setting the total downlink assignment index in TPC fields in some of the downlink control information, or setting a PUCCH format 4 resource indicator in TPC fields in some of the downlink control information may be specifically as follows: setting the total downlink assignment index in the TPC field in the downlink control information if the carrier number of the carrier corresponding to the downlink control information is greater than the first carrier quantity threshold, and parity of the carrier number of the carrier corresponding to the downlink control information is the same as that of the first carrier quantity threshold; or setting the PUCCH format 4 resource indicator in the TPC field in the downlink control information if the carrier number of the carrier corresponding to the downlink control information is greater than the first carrier quantity threshold, and parity of the carrier number of the carrier corresponding to the downlink control information is different from that of the first carrier quantity threshold.

The method for sending control information provided in this embodiment is used to complete processing in the second base station embodiment. Implementation principles and technical effects of the method are similar, and details are not described herein.

Figure 11:
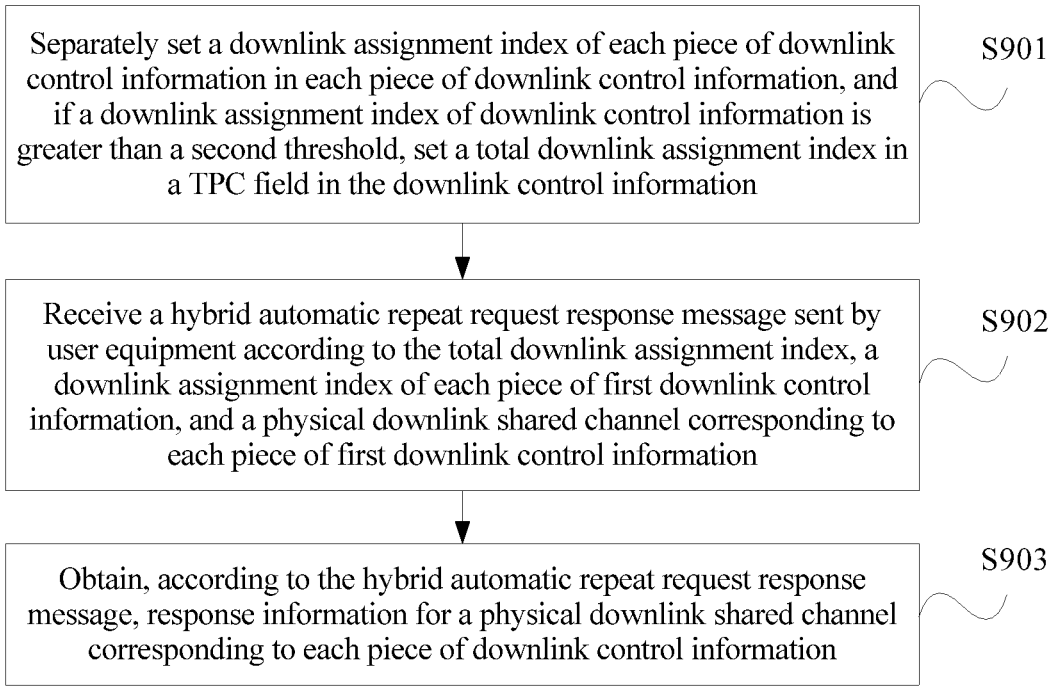
FIG. 11 is a flowchart of a ninth embodiment of a method for sending control information according to the present disclosure.

FIG. 11 is a flowchart of a ninth embodiment of a method for sending control information according to the present disclosure. As shown in FIG. 11, the method in this embodiment may include the following steps.

S901. Separately set a downlink assignment index of each piece of downlink control information in each piece of downlink control information, and if a downlink assignment index of downlink control information is greater than a second threshold, set the total downlink assignment index in a TPC field in the downlink control information.

S902. Receive a hybrid automatic repeat request response message sent by the user equipment according to the total downlink assignment index, a downlink assignment index of each piece of first downlink control information, and a physical downlink shared channel corresponding to each piece of first downlink control information.

S903. Obtain, according to the hybrid automatic repeat request response message, response information for a physical downlink shared channel corresponding to each piece of downlink control information.

If there are multiple pieces of downlink control information whose downlink assignment indexes are greater than the second threshold, the setting the total downlink assignment index in a TPC field in the downlink control information may be specifically as follows: setting the total downlink assignment index in TPC fields in some of the downlink control information, or setting a PUCCH format 4 resource indicator in TPC fields in some of the downlink control information. Further, the setting the total downlink assignment index in TPC fields in some of the downlink control information, or setting a PUCCH format 4 resource indicator in TPC fields in some of the downlink control information may be specifically as follows: setting the total downlink assignment index in the TPC field in the downlink control information if the downlink assignment index of the downlink control information is greater than the second threshold, and parity of the downlink assignment index is the same as that of the second threshold; or setting the PUCCH format 4 resource indicator in the TPC field in the downlink control information if the downlink assignment index of the downlink control information is greater than the second threshold, and parity of the downlink assignment index is different from that of the second threshold.

The method for sending control information provided in this embodiment is used to complete processing in the third base station embodiment. Implementation principles and technical effects of the method are similar, and details are not described herein.

Figure 12:
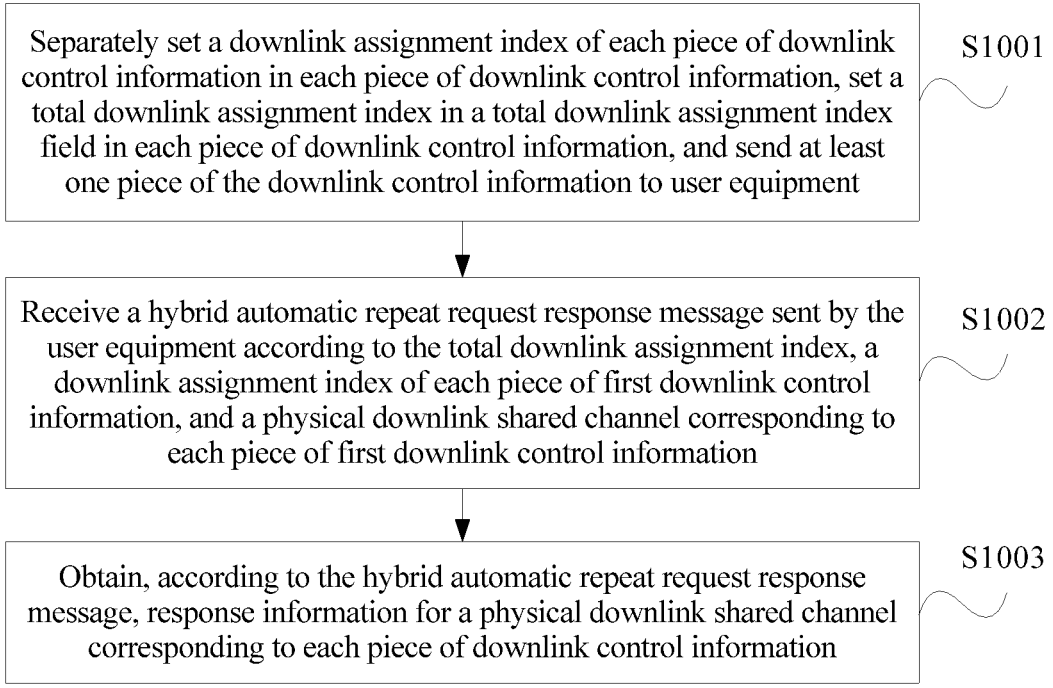
FIG. 12 is a flowchart of a tenth embodiment of a method for sending control information according to the present disclosure.

FIG. 12 is a flowchart of a tenth embodiment of a method for sending control information according to the present disclosure. As shown in FIG. 12, the method in this embodiment may include the following steps.

S1001. Separately set a downlink assignment index of each piece of downlink control information in each piece of downlink control information, set the total downlink assignment index in a total downlink assignment index field in each piece of downlink control information, and send at least one piece of the downlink control information to user equipment.

S1002. Receive a hybrid automatic repeat request response message sent by the user equipment according to the total downlink assignment index, a downlink assignment index of each piece of first downlink control information, and a physical downlink shared channel corresponding to each piece of first downlink control information.

S1003. Obtain, according to the hybrid automatic repeat request response message, response information for a physical downlink shared channel corresponding to each piece of downlink control information.

The method for sending control information provided in this embodiment is used to complete processing in the fourth base station embodiment. Implementation principles and technical effects of the method are similar, and details are not described herein.

Figure 13:
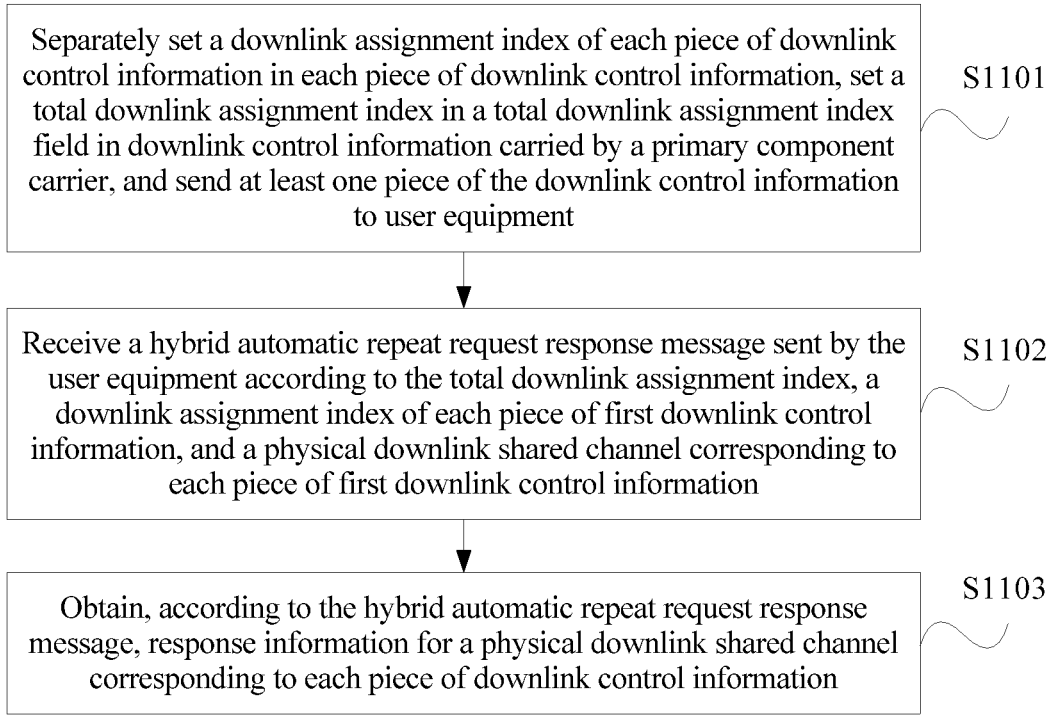
FIG. 13 is a flowchart of an eleventh embodiment of a method for sending control information according to the present disclosure.

FIG. 13 is a flowchart of an eleventh embodiment of a method for sending control information according to the present disclosure. As shown in FIG. 13, the method in this embodiment may include the following steps.

S1101. Separately set a downlink assignment index of each piece of downlink control information in each piece of downlink control information, set the total downlink assignment index in a total downlink assignment index field in downlink control information carried by a primary component carrier, and send at least one piece of the downlink control information to the user equipment.

S1102. Receive a hybrid automatic repeat request response message sent by the user equipment according to the total downlink assignment index, a downlink assignment index of each piece of first downlink control information, and a physical downlink shared channel corresponding to each piece of first downlink control information.

S1103. Obtain, according to the hybrid automatic repeat request response message, response information for a physical downlink shared channel corresponding to each piece of downlink control information.

The method for sending control information provided in this embodiment is used to complete processing in the fifth base station embodiment. Implementation principles and technical effects of the method are similar, and details are not described herein.

Figure 14:
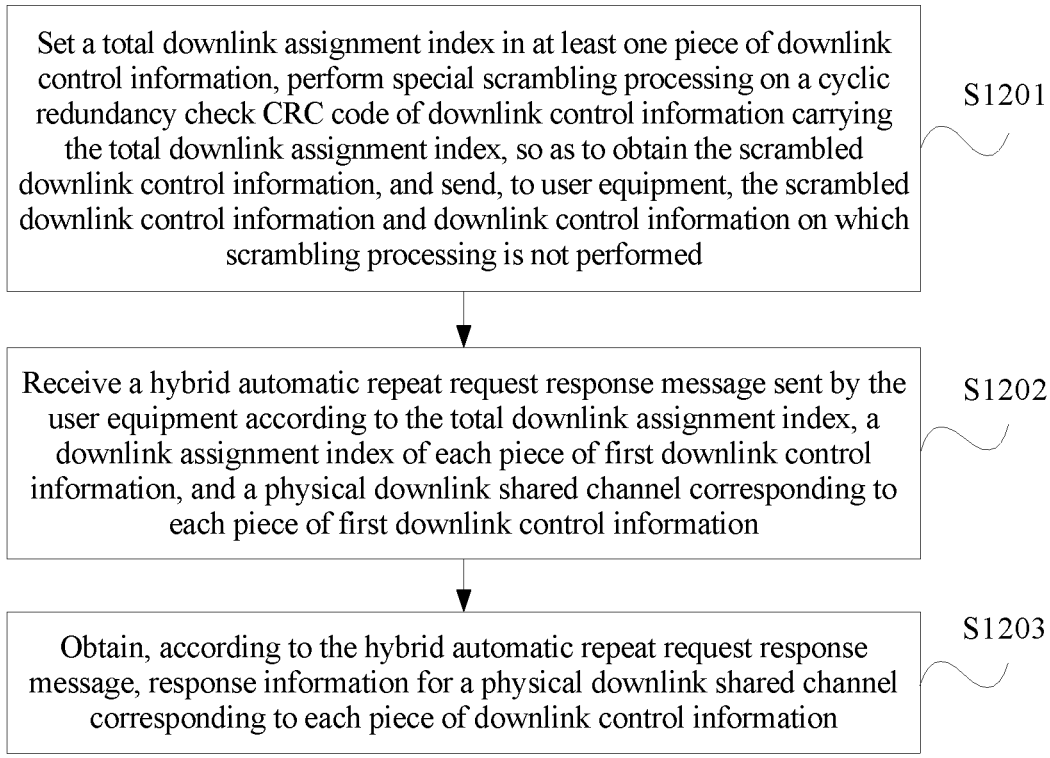
FIG. 14 is a flowchart of a twelfth embodiment of a method for sending control information according to the present disclosure.

FIG. 14 is a flowchart of a twelfth embodiment of a method for sending control information according to the present disclosure. As shown in FIG. 14, the method in this embodiment may include the following steps.

S1201. Set the total downlink assignment index in at least one piece of downlink control information, perform special scrambling processing on a cyclic redundancy check (CRC)

code of downlink control information carrying the total downlink assignment index, so as to obtain the scrambled downlink control information, and send, to the user equipment, the scrambled downlink control information and downlink control information on which scrambling processing is not performed.

Both the scrambled downlink control information and the downlink control information on which scrambling processing is not performed carry a downlink assignment index.

S1202. Receive a hybrid automatic repeat request response message sent by the user equipment according to the total downlink assignment index, a downlink assignment index of each piece of first downlink control information, and a physical downlink shared channel corresponding to each piece of first downlink control information.

S1203. Obtain, according to the hybrid automatic repeat request response message, response information for a physical downlink shared channel corresponding to each piece of downlink control information.

The method for sending control information provided in this embodiment is used to complete processing in the sixth base station embodiment. Implementation principles and technical effects of the method are similar, and details are not described herein.

On a basis of the seventh embodiment to the twelfth embodiment of the foregoing method for sending control information, further, if a quantity of bits occupied by the total downlink assignment index is less than 5 bits, a status quantity corresponding to the quantity of bits occupied by the total downlink assignment index is obtained; a status corresponding to the total downlink assignment index is obtained by obtaining a remainder of the total downlink assignment index divided by the status quantity; and the total downlink assignment index is represented by using the status corresponding to the total downlink assignment index.

A sending module 13 in an embodiment of the present disclosure may be corresponding to a transmitter of user equipment, or may be corresponding to a transceiver of the user equipment. A receiving module 11 may be corresponding to a receiver of the user equipment, or may be corresponding to a transceiver of the user equipment. A processing module 12 may be corresponding to a processor of the user equipment. The processor herein may be a central processing unit (CPU), or an application specific integrated circuit (ASIC), or one or more integrated circuits for completing implementation of this embodiment of the present disclosure. The user equipment may further include a memory. The memory is configured to store instruction code. The processor invokes the instruction code in the memory, so as to control the sending module 13 and the receiving module 11 in this embodiment of the present disclosure to execute the foregoing operation.

It should be noted that, a receiving module 22 in an embodiment of the present disclosure may be corresponding to a receiver of a base station, or may be corresponding to a transceiver of the base station. A sending module 21 may be corresponding to a transmitter of the base station, or may be corresponding to a transceiver of the base station. A processing module 23 may be corresponding to a processor of the base station. The processor herein may be a central processing unit (CPU), or an application-specific integrated circuit (ASIC), or one or more integrated circuits for completing implementation of this embodiment of the present disclosure. The base station may further include a memory. The memory is configured to store instruction code. The processor invokes the instruction code in the memory, so as to control the receiving module 22 and the sending module 21 in this embodiment of the present disclosure to execute the foregoing operation.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, that is, the parts may be located in one position, or may be distributed on multiple network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium, and includes several instructions for instructing a computer device (which may be a personal computer, a server, a network device, or the like) or a processor to perform some steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is merely used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, refer to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An apparatus, comprising:
 a processor; and
 a non-transitory computer readable storage medium storing a program for execution by the processor, the program causes the apparatus to:
  receive a plurality of pieces of first downlink control information sent by a base station, wherein the plurality of pieces of first downlink control information carry downlink assignment indexes, and wherein at least one piece of the plurality of pieces of first downlink control information further carries a total downlink assignment index;
  generate a hybrid automatic repeat request response message according to the total downlink assignment index, the downlink assignment indexes of the plurality of pieces of first downlink control information, and physical downlink shared channels corresponding to the plurality of pieces of first downlink control information; and
 wherein the downlink assignment indexes indicate indexes of the physical downlink shared channels corresponding to the plurality of pieces of first downlink control information carrying the downlink assignment indexes and physical downlink control channels indicating downlink semi-persistent scheduling release;
 wherein the total downlink assignment index is a sum of a quantity of physical downlink shared channels corresponding to the plurality of pieces of first downlink control information and a quantity of physical downlink control channels indicating downlink semi-persistent scheduling release; and
 wherein the program further causes the apparatus to:
 when the total downlink assignment index is greater than a hybrid automatic repeat request response message bit quantity threshold, send the hybrid automatic repeat request response message to the base station using a physical uplink control channel format 4; or when the total downlink assignment index is less than or equal to the hybrid automatic repeat request response message bit quantity threshold, send the hybrid automatic repeat request response message to the base station using a physical uplink control channel format 3.

2. The apparatus according to claim 1, wherein the program further causes the apparatus to:
 separately generate first response information for the physical downlink shared channels corresponding to the plurality of pieces of first downlink control information, according to whether the physical downlink shared channels corresponding to the plurality of pieces of first downlink control information are correctly decoded;
 obtain a sorting result by sorting the downlink assignment indexes;
 determine second downlink control information according to the sorting result and according to the total downlink assignment index;
 obtain a second downlink assignment index of the second downlink control information, wherein second response information for a second physical downlink shared channel corresponding to the second downlink control information is a negative acknowledgment (NACK); and
 generate the hybrid automatic repeat request response message according to the first response information for the physical downlink shared channels corresponding to the plurality of pieces of first downlink control information and according to the second response information for the second physical downlink shared channel corresponding to the second downlink control information; and
 wherein an arrangement order of the first response information for the physical downlink shared channels corresponding to the plurality of pieces of first downlink control information and the second response information for the second physical downlink shared channel corresponding to the second downlink control information is the same as an order of the downlink assignment indexes of the plurality of pieces of first downlink control information and the second downlink assignment index of the second downlink control information.

3. The apparatus according to claim 1, wherein the program further causes the apparatus to:
 obtain the downlink assignment indexes of the plurality of pieces of first downlink control information; and
 obtain the total downlink assignment index in a total downlink assignment indexes field in the plurality of pieces of first downlink control information.

4. The apparatus according to claim 1, wherein the program further causes the apparatus to:
 obtain the total downlink assignment index in transmit power control (TPC) fields in some of the first downlink control information, or obtain a physical uplink control channel format 4 resource indicator in TPC fields in some of the first downlink control information, wherein multiple pieces of the first downlink control information correspond to carriers whose carrier numbers are greater than a first carrier quantity threshold.

5. The apparatus according to claim 1, wherein the program further comprise instructions to:
 set a second threshold;
 obtain the downlink assignment indexes of the plurality of pieces of first downlink control information; and
 obtain the total downlink assignment index in a TPC field in the first downlink control information corresponding to the downlink assignment indexes, in response to a downlink assignment index of the first downlink control information being greater than the second threshold.

6. An apparatus, comprising:
 a processor; and
 a non-transitory computer readable storage medium storing a program for execution by the processor, the program causes the apparatus to:
  send a plurality of pieces of downlink control information to a user equipment, wherein the plurality of pieces of downlink control information carry downlink assignment indexes, and wherein at least one piece of the plurality of pieces of downlink control information further carries a total downlink assignment index;
  receive a hybrid automatic repeat request response message sent by the user equipment according to the total downlink assignment index, according to the downlink assignment indexes of the plurality of pieces of downlink control information, and according to physical downlink shared channels corresponding to the plurality of pieces of downlink control information; and
  obtain, according to the hybrid automatic repeat request response message, response information for a physical downlink shared channel corresponding to the plurality of pieces of downlink control information; and wherein the downlink assignment indexes indicate indexes of the physical downlink shared channels corresponding to the plurality of pieces of downlink control information carrying the downlink assignment indexes and a physical downlink control channel indicating downlink semi-persistent scheduling release;

wherein the total downlink assignment index is a sum of a quantity of the physical downlink shared channels corresponding to the plurality of pieces of downlink control information and a quantity of physical downlink control channels indicating downlink semi-persistent scheduling release; and wherein when the total downlink assignment index is greater than a hybrid automatic repeat request response message bit quantity threshold, the hybrid automatic repeat request response message received is in a physical uplink control channel format 4; or when the total downlink assignment index is less than or equal to the hybrid automatic repeat request response message bit quantity threshold, the hybrid automatic repeat request response message received is in a physical uplink control channel format 3.

7. The apparatus according to claim 6, wherein the downlink assignment indexes of the plurality of pieces of downlink control information are separately set in the plurality of pieces of downlink control information, and wherein the total downlink assignment index is set in a total downlink assignment indexes field in the plurality of pieces of downlink control information.

8. The apparatus according to claim 6, wherein the downlink assignment indexes of the plurality of pieces of downlink control information are separately set in the plurality of pieces of downlink control information, and wherein the total downlink assignment index is set in a total downlink assignment index field in downlink control information carried by a primary component carrier.

9. The apparatus according to claim 6, wherein the program further causes the apparatus to:
set the total downlink assignment index in a first piece of downlink control information of the plurality of pieces of downlink control information;
perform special scrambling processing on a cyclic redundancy check (CRC) code of the first piece of downlink control information carrying the total downlink assignment index;
obtain scrambled first piece of downlink control information; and
send, to the user equipment, the scrambled first piece of downlink control information and second downlink control information on which scrambling processing is not performed; and
wherein both the scrambled first piece of downlink control information and the second downlink control information on which scrambling processing is not performed carry a downlink assignment index.

10. A method comprising:
receiving, by a user equipment, a plurality of pieces of first downlink control information sent by a base station, wherein the plurality of pieces of first downlink control information carry downlink assignment indexes, and wherein at least one piece of the plurality of pieces of first downlink control information further carries a total downlink assignment index;

generating, by the user equipment, a hybrid automatic repeat request response message according to the total downlink assignment index, according to the downlink assignment indexes of the plurality of pieces of first downlink control information, and according to physical downlink shared channels corresponding to the plurality of pieces of first downlink control information; and wherein the downlink assignment indexes indicate indexes of the physical downlink shared channels corresponding to the plurality of pieces of first downlink control information carrying the downlink assignment indexes and physical downlink control channels indicating downlink semi-persistent scheduling release;

wherein the total downlink assignment index is a sum of a quantity of physical downlink shared channels corresponding to the plurality of pieces of first downlink control information and a quantity of physical downlink control channels indicating downlink semi-persistent scheduling release; and wherein the method further comprises:
when the total downlink assignment index is greater than a hybrid automatic repeat request response message bit quantity threshold, sending the hybrid automatic repeat request response message to the base station using a physical uplink control channel format 4; or when the total downlink assignment index is less than or equal to the hybrid automatic repeat request response message bit quantity threshold, sending the hybrid automatic repeat request response message to the base station using a physical uplink control channel format 3.

11. The method according to claim 10, wherein generating the hybrid automatic repeat request response message comprises:
separately generating first response information for the physical downlink shared channels corresponding to the plurality of pieces of first downlink control information, according to whether the physical downlink shared channels corresponding to the plurality of pieces of first downlink control information are correctly decoded;
obtaining a sorting result by sorting the downlink assignment indexes;
determining second downlink control information according to the sorting result and according to the total downlink assignment index;
obtaining a second downlink assignment index of the second downlink control information, wherein second response information for a second physical downlink shared channel corresponding to the second downlink control information is a negative acknowledgment (NACK); and
generating the hybrid automatic repeat request response message according to the first response information for the physical downlink shared channels corresponding to the plurality of pieces of first downlink control information and according to the second response information for the second physical downlink shared channel corresponding to the second downlink control information; and
wherein an arrangement order of the first response information for the physical downlink shared channels corresponding to the plurality of pieces of first downlink control information and the second response information for the second physical downlink shared channel corresponding to the second downlink control information is the same as an order of the downlink assignment indexes of the plurality of pieces of first downlink control information and the second downlink assignment index of the second downlink control information.

12. The method according to claim 10, wherein receiving the plurality of pieces of first downlink control information comprises:
  setting a first carrier quantity threshold;
  receiving the plurality of pieces of first downlink control information sent by the base station;
  obtaining the downlink assignment indexes of the plurality of pieces of first downlink control information; and
  obtaining the total downlink assignment index in a transmit power control (TPC) field in the first downlink control information, wherein a carrier number of a carrier corresponding to the first downlink control information is greater than a first carrier quantity threshold.

13. A method comprising:
  sending, by a base station, a plurality of pieces of downlink control information to a user equipment, wherein the plurality of pieces of downlink control information carry downlink assignment indexes, and wherein at least one piece of the plurality of pieces of downlink control information further carries a total downlink assignment index;
  receiving, by the base station, a hybrid automatic repeat request response message sent by the user equipment, according to the total downlink assignment index, according to the downlink assignment indexes of the plurality of pieces of downlink control information, and according to physical downlink shared channels corresponding to the plurality of pieces of downlink control information; and
  obtaining, by the base station, according to the hybrid automatic repeat request response message, response information for the physical downlink shared channels corresponding to the plurality of pieces of downlink control information;
  wherein the downlink assignment indexes indicate indexes of the physical downlink shared channels corresponding to the plurality of pieces of downlink control information carrying the downlink assignment indexes and a physical downlink control channel indicating downlink semi-persistent scheduling release;
  wherein the total downlink assignment index is a sum of a quantity of the physical downlink shared channels corresponding to the plurality of pieces of downlink control information and a quantity of physical downlink control channels indicating downlink semi-persistent scheduling release; and
  wherein when the total downlink assignment index is greater than a hybrid automatic repeat request response message bit quantity threshold, the hybrid automatic repeat request response message received is in a physical uplink control channel format 4; or when the total downlink assignment index is less than or equal to the hybrid automatic repeat request response message bit quantity threshold, the hybrid automatic repeat request response message received is in a physical uplink control channel format 3.

14. The method according to claim 13, wherein the total downlink assignment index is carried in a transmit power control (TPC) field of the at least one piece of the plurality of pieces of downlink control information.

15. The method according to claim 13, wherein a piece of the plurality of pieces of downlink control information comprises a physical uplink control channel format 4 resource indicator in a TPC field.

16. The method according to claim 13, further comprising:
  sending, by the base station to the user equipment, the hybrid automatic repeat request response message bit quantity threshold.

17. The method according to claim 13, further comprising:
  separately setting the downlink assignment indexes of the plurality of pieces of downlink control information in the plurality of pieces of downlink control information; and
  setting the total downlink assignment index in total downlink assignment index fields in the plurality of pieces of downlink control information.

18. The method according to claim 13, further comprising:
  separately setting the downlink assignment indexes of the plurality of pieces of downlink control information in the plurality of pieces of downlink control information; and
  setting the total downlink assignment index in a total downlink assignment index field in downlink control information carried by a primary component carrier.

19. The method according to claim 13, wherein sending the plurality of pieces of downlink control information comprises:
  setting the total downlink assignment index in a first piece of downlink control information of the plurality of pieces of downlink control information, and performing special scrambling processing on a cyclic redundancy check (CRC) code of the first piece of downlink control information carrying the total downlink assignment index, to obtain scrambled first piece of downlink control information; and
  sending, to the user equipment, the scrambled first piece of downlink control information and downlink control information on which scrambling processing is not performed, wherein both the scrambled first piece of downlink control information and the downlink control information on which scrambling processing is not performed carry a downlink assignment index.

20. The method according to claim 13, further comprising:
  sending, by the base station to the user equipment, a quantity of carriers configured for the user equipment.

* * * * *